US006281917B1

(12) United States Patent
Katsuragi et al.

(10) Patent No.: US 6,281,917 B1
(45) Date of Patent: Aug. 28, 2001

(54) IMAGE FORMING PROCESS EMPLOYING LIQUID COMPOSITION AND INK IN COMBINATION

(75) Inventors: Ryuji Katsuragi; Mayumi Yamamoto, both of Tokyo; Hisashi Teraoka, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/049,921

(22) Filed: Mar. 30, 1998

(30) Foreign Application Priority Data

Apr. 1, 1997 (JP) .................................................... 9-096364

(51) Int. Cl.[7] ...................................................... G01D 11/00

(52) U.S. Cl. .......................... 347/100; 347/101; 347/102; 106/31.57; 106/31.58

(58) Field of Search ............................. 106/31.57, 31.58; 347/100, 101, 102

(56) References Cited

U.S. PATENT DOCUMENTS

| | | | | |
|---|---|---|---|---|
| 5,131,910 | * | 7/1992 | Breault | 8/400 |
| 5,167,703 | | 12/1992 | Eida et al. | 106/22 K |
| 5,262,527 | * | 11/1993 | Gregory et al. | 534/797 |
| 5,425,134 | * | 6/1995 | Ishida | 395/109 |
| 5,451,251 | | 9/1995 | Mafune et al. | 106/22 H |
| 5,549,740 | | 8/1996 | Takahashi et al. | 106/20 R |
| 5,614,007 | | 3/1997 | Kurabayashi et al. | 106/22 R |
| 5,624,484 | | 4/1997 | Takahashi et al. | 106/31.75 |
| 5,640,187 | | 6/1997 | Kashiwazaki et al. | 347/101 |
| 5,700,314 | | 12/1997 | Kurabayashi et al. | 106/31.27 |
| 5,728,201 | | 3/1998 | Saito et al. | 106/31.48 |
| 5,792,249 | * | 8/1998 | Shirota et al. | 106/31.27 |
| 5,835,116 | | 11/1998 | Sato et al. | 347/98 |
| 5,985,975 | | 11/1999 | Kurabayashi et al. | 524/462 |
| 6,027,210 | | 2/2000 | Kurabayashi et al. | 347/100 |
| 6,158,856 | | 12/2000 | Sato et al. | 347/101 |

FOREIGN PATENT DOCUMENTS

| | | |
|---|---|---|
| 63-299971 | 12/1988 | (JP) . |
| 64-9279 | 1/1989 | (JP) . |
| 64-63185 | 3/1989 | (JP) . |

OTHER PUBLICATIONS

Registry Copyright 2000 ACS, Registry# 218281–60–8, 218281–61–9, 225239–68–9.*

* cited by examiner

*Primary Examiner*—John Barlow
*Assistant Examiner*—Manish S. Shah
(74) *Attorney, Agent, or Firm*—Fitzpatrick, Cella, Harper & Scinto

(57) ABSTRACT

Provided is a process for the formation of an image employing a liquid composition and a colored ink in combination to form a colored image on a recording medium, comprising using at least a magenta ink as the colored ink, wherein said magenta ink provides an image of magenta color, which satisfies all color senses represented by the following equations:

$$\sqrt{(a_1*)^2+(b_1*)^2} \geqq \sqrt{(a_0*)^2+(b_0*)^2} \quad \text{(I)},$$

$$40 \leqq L_1* \leqq 80 \quad \text{(II)},$$

$$50 \leqq a_1* \leqq 70 \quad \text{(III), and}$$

$$-30 \leqq b_1* \leqq 5 \quad \text{(IV)},$$

where in the formulae (I), (II), (III) and (IV), $L_1$*, $a_1$*, $b_1$*, $a_0$* and $b_0$* each represent a colorimetric value which is defined in the CIE 1976 (L*a*b*) color space; $a_1$* and $b_1$* each represent a colorimetric value of the image, which is obtained by using a liquid composition and a colored ink on a test paper having a whiteness of from 78 to 84, in accordance with JIS P 8123, measured by a Hunter Whiteness meter, and a chromaticity of $86 \leqq L^* \leqq 93$, $3 \leqq a^* \leqq 10$ and $-6 \leqq b^* \leqq 1$, said chromaticity being defined in the CIE 1976 (L*a*b*) color space; and $a_0$* and $b_0$* each represent a colorimetric value of the image, which is obtained by using only a colored ink on said test paper.

18 Claims, 5 Drawing Sheets

IMAGE FORMING PROCESS EMPLOYING LIQUID COMPOSITION AND INK IN COMBINATION

BACKGROUND OF THE INVENTION

1. Field of the Invention

This invention relates to a process for the formation of images by using a liquid composition and an ink in combination, and more particularly to a process for the formation of images by applying a liquid composition and a colored ink to a recording medium (for example a plain paper), and especially to a process for the formation of images employing a liquid composition and a colored ink in combination by means of an ink-jet process, thereby forming a color image excellent in the magenta-color formation and water fastness.

2. Related Background Art

The ink-jet recording process has been hitherto generally used for a universal printer, copier and the like because of its various kinds of advantages such as, for example, less noise, a low running cost, the easy miniaturization of the device, the easy coloring and so on. However, when images are formed on a recording medium of so-called plain paper by these recording devices being applied with the ink-jet recording process, there has been a problem in which the resulting printed product shows less water fastness.

To solve the problem and improve the water fastness of the resulting recorded image, there have been proposed processes in which a liquid composition is applied previously onto the recording medium. For example, Japanese Patent Application Laid-Open No. 63-299971 discloses a process in which a liquid composition containing an organic compound having two or more cationic groups per molecule is applied onto a recording medium and then recording is performed with an ink containing an anionic dye. Japanese Patent Application Laid-Open No. 64-9279 discloses a process in which an acidic liquid composition containing succinic acid and the like is applied onto a recording medium, and then recording is performed with an ink containing an anionic dye. Further, Japanese Patent Application Laid-Open No. 64-63185 discloses a process in which a liquid composition which insolubilizes a dye is applied onto a recording medium before recording is performed with an ink.

SUMMARY OF THE INVENTION

However, these processes aim at improving the separation of dye itself on the recording medium to improve the water fastness of recorded images. Therefore, in particular for recording in magenta color, there is often a reduction of coloristic property of the dye itself due to the coagulation of dye molecules and the non-homogeneous distribution of separated dye on the recording paper, so that there is a problem that the recorded images tend to be dark, resulting in a lowered coloristic property of recorded images.

Accordingly, the object of the present invention is to provide a technique through which clear images being printed especially in magenta color, which are excellent in the water fastness and the coloristic property, can be obtained when a plain paper is used as a recording medium, and in particular to a process for the formation of images by using the ink-jet process.

The above object can be achieved by the present invention described below.

According to the present invention, there is provided a process for the formation of an image employing a liquid composition and a colored ink in combination to form a colored image on a recording medium, comprising using at least a magenta ink as the colored ink, wherein said magenta ink provides an image of magenta color, which satisfies all color senses represented by the equations:

$$\sqrt{(a_1^*)^2+(b_1^*)^2} \geqq \sqrt{(a_0^*)^2+(b_0^*)^2} \quad \text{(I)},$$

$$40 \leqq L_1^* \leqq 80 \quad \text{(II)},$$

$$50 \leqq a_1^* \leqq 70 \quad \text{(III), and}$$

$$-30 \leqq b_1^* \leqq 5 \quad \text{(IV)},$$

where in the formulae (I), (II), (III) and (IV), $L_1^*$, $a_1^*$, $b_1^*$, $a_0^*$ and $b_0^*$ each represent a colorimetric value which is defined in the CIE 1976 (L*a*b*) color space; $a_1^*$ and $b_1^*$ each represent a colorimetric value of the image, which is obtained by using a liquid composition and a colored ink on a test paper having a whiteness of from 78 to 84, in accordance with JIS P 8123, measured by a Hunter Whiteness meter, and a chromaticity of $86 \leqq L^* \leqq 93$, $3 \leqq a^* \leqq 10$ and $-6 \leqq b^* \leqq 1$, said chromaticity being defined in the CIE 1976 (L*a*b*) color space; and $a_0^*$ and $b_0^*$ each represent a colorimetric value of the image, which is obtained by using only a colored ink on said test paper.

According to the present invention, there is also provided an ink-jet recording process for the formation of an image employing a liquid composition and a colored ink in combination to form a colored image on a recording medium, comprising using at least a magenta ink as the colored ink, wherein said magenta ink provides an image of magenta color, which satisfies all color senses represented by the equations:

$$\sqrt{(a_1^*)^2+(b_1^*)^2} \geqq \sqrt{(a_0^*)^2+(b_0^*)^2} \quad \text{(I)},$$

$$40 \leqq L_1^* \leqq 80 \quad \text{(II)},$$

$$50 \leqq a_1^* \leqq 70 \quad \text{(III), and}$$

$$-30 \leqq b_1^* \leqq 5 \quad \text{(IV)},$$

where in the formulae (I), (II), (III) and (IV), $L_1^*$, $a_1^*$, $b_1^*$, $a_0^*$ and $b_0^*$ each represent a colorimetric value which is defined in the CIE 1976 (L*a*b*) color space; $a_1^*$ and $b_1^*$ each represent a colorimetric value of the image, which is obtained by using a liquid composition and a colored ink on a test paper having a whiteness of from 78 to 84, in accordance with JIS P 8123, measured by a Hunter Whitenessmeter, and a chromaticity of $86 \leqq L^* \leqq 93$, $3 \leqq a^* \leqq 10$ and $-6 \leqq b^* \leqq 1$, said chromaticity being defined in the CIE 1976 (L*a*b*) color space; and $a_0^*$ and $b_0^*$ each represent a colorimetric value of the image, which is obtained by using only a colored ink on said test paper.

DESCRIPTION OF THE PREFERRED EMBODIMENT

Figure 1:
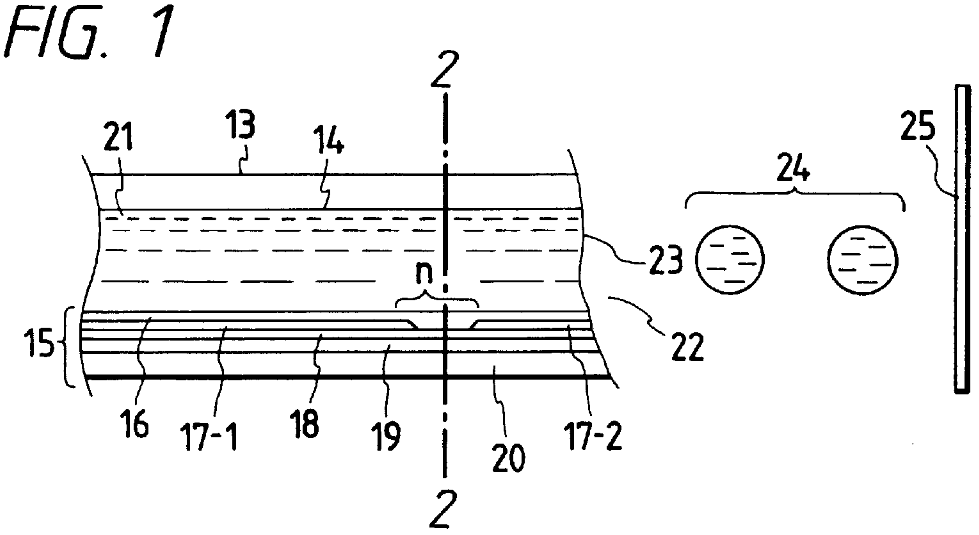
FIG. 1 is a longitudinal cross section of a head assembly of an ink-jet recording apparatus.

The CIE 1976 (L*a*b*), which has been converted from the previous CIE XYZ color specification system and recommended by the International Illumination Committee in 1976, is a color space, which is defined in such manner that a fixed distance in the color specification system may have a sensorially approximately equal difference in every color region, and has been used for JIS Z 8729 "Specification of Colour of Materials according to the CIE 1976 (L*a*b*) Space and the CIE 1976 (L*u*v*) Space", etc. The measurement method is in accordance with JIS Z 8722.

The preferred embodiment according to the present invention will be explained in detail.

As a result of earnest studies to solve the above mentioned previous problems, the present inventors have reached the present invention based on the fact that it has been found that recorded images formed especially on a plain paper with excellent water fastness and superior coloristic property can be obtained when the color sense of ink to be used for the formation of image satisfies wholly the above mentioned equations (I), (II), (III), and (IV). That is, an ink which satisfies wholly the equations (I), (II), (III) and (IV) does not cause lowering of the coloristic property of dye itself due to dye coagulation, even when the ink may be mixed with a liquid composition on the recording medium, and the dye separated may easily be distributed uniformly on a recording paper, so that the coloristic property of the resulting image may not be damaged.

Further, according to the present invention, when a liquid composition and an ink are mixed on a recording paper, a cationic substance in the liquid composition and an anionic substance in the ink are associated by an ionic interaction and the resulting associate is essentially insoluble in water, so that the water fastness of the resulting recorded image becomes perfect.

The ink and the liquid composition used preferably in the present invention are explained in detail as follows.

The ink used in the present invention is used for a process for the formation of an image comprising a step (A) in which a liquid composition comprising a cationic substance is applied to a recording medium and a step (B) in which an ink comprising an anionic substance is then applied to the recording medium, and provides a recorded image of magenta color which satisfies wholly the color sense represented by the equations:

$$\sqrt{(a_1^*)^2+(b_1^*)^2} \geqq \sqrt{(a_0^*)^2+(b_0^*)^2} \quad \text{(I)},$$

$$40 \leqq L_1^* \leqq 80 \quad \text{(II)},$$

$$50 \leqq a_1^* \leqq 70 \quad \text{(III), and}$$

$$-30 \leqq b_1^* \leqq 5 \quad \text{(IV)},$$

where in the formulae above, $L_1^*$, $a_1^*$, $b_1^*$, $a_0^*$ and $b_0^*$ each represent a colorimetric value which is defined in the CIE 1976 (L*a*b*) color space; $a_1^*$ and $b_1^*$ each represent a colorimetric value of the image, which is obtained by using the process for the formation of an image comprising steps (A) and (B) and $a_0^*$ and $b_0^*$ each represent a colorimetric value of the image, which is obtained by using the process for the formation of an image comprising only step (B).

In the present invention, the values of $L_1^*$, $a_1^*$ and $b_1^*$ in the formulae above can be obtained, for example, by measuring chromaticities of a solid print, respectively, by means of a high speed spectrophotometer (CA-35, trade name, available from Murakami Shikisai Gijutsu Kenkyusho) after the solid print is formed on a plain paper using a liquid composition and an ink and then left standing for an hour. The values of $L_0^*$, $a_0^*$ and $b_0^*$ can be obtained by measuring chromaticities of a control solid print which is obtained by the same manner as above except for using only the ink. From the values of $L_1^*$, $a_1^*$, $b_1^*$, $L_0^*$, $a_0^*$ and $b_0^*$, the equation (I) is calculated to select a combination of ink and liquid composition capable of attaining good coloristic property of images satisfying the above relationship.

The ink used in the present invention should contain at least an anionic substance to improve the water fastness of the recorded image so that the substance may tonically interact with the cationic substance in the liquid composition to cause the association. As anionic substances used preferably in the present invention, there are mentioned water-soluble magenta dyes having an anionic group which may act as an ink colorant. Water-soluble magenta dyes having an anionic group, which are preferred in the present invention, are those having a sulfonic acid group and a carboxylic group. For example, there are mentioned water-soluble magenta dyes of the formula $$Ar_1—N=N—J—X—(NR_1—L—NR_2—X)_n—J—N=N—Ar_2 \quad \text{(V)}$$

wherein J represents a radical of the formula:

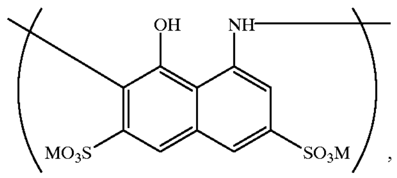
, where M represents a hydrogen atom, an alkali metal, an ammonium or organic ammonium group; $Ar_1$ and $Ar_2$ each represent an aryl or a substituted aryl radical, and at least one of $Ar_1$ and $Ar_2$ may have at least a substituent selected from the groups of the formulae —COOM and —COSM; $R_1$ and $R_2$ each represent independently a hydrogen atom, an alkyl, a substituted alkyl, a cyclic alkyl, a substituted cyclic alkyl, an alkenyl or a substituted alkenyl; L represents a divalent linking group; n is 0 or 1; X represents carbonyl or one of radicals of the formulae:

(a)

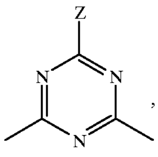
,

-continued (b)

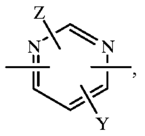

and (c)

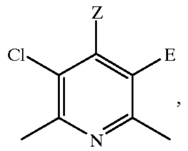

where Z represents $NR_3R_4$, $SR_5$ or $OR_5$, Y represents a hydrogen atom, a chlorine atom, Z, $SR_6$ or $OR_6$, E represents a chlorine atom or a —CN group, $R_3$, $R_4$, $R_5$ and $R_6$ each represent independently a hydrogen atom, an alkyl, a substituted alkyl, an alkenyl, a substituted alkenyl, an aryl, a substituted aryl, an aralkyl or a substituted aralkyl, or $R_3$ and $R_4$ may form a 5- or 6-membered ring together with a nitrogen atom bonded thereto.

A compound of the formula (V) may have a $—SO_3M$ group the number of which is more than that of the group selected from —COOM and —COSM, where M is a hydrogen atom, an alkali metal, an ammonium or organic ammonium.

As an alkali metal in the formula (V), there is mentioned for example, lithium, sodium, potassium or the like; as an organic ammonium, there is mentioned for example, mono-, di-, and trimethyl ammonium, mono-, di- and triethyl ammonium, mono-, di-, and tri-ethanol ammonium or the like.

Examples of a dye represented by the above formula (V) are shown specifically as follows, but the present invention is not limited thereto.

Compound 1:

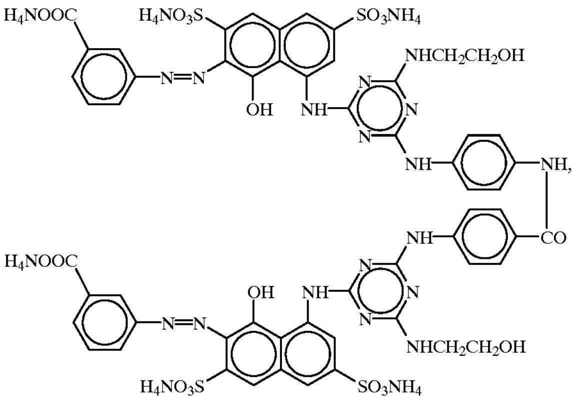

-continued

Compound 2:

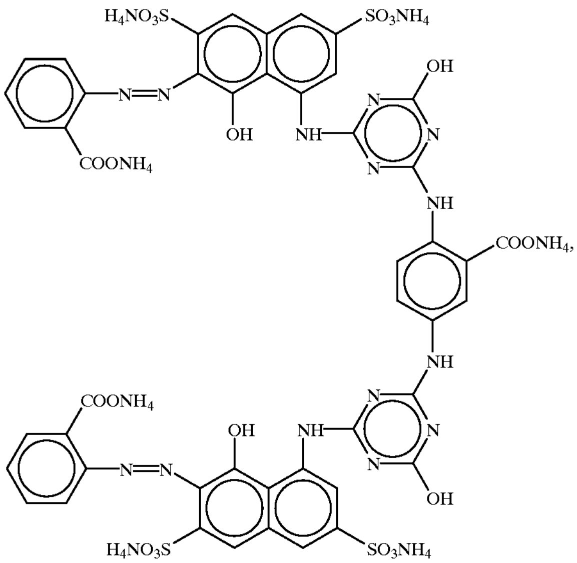

Compound 3:

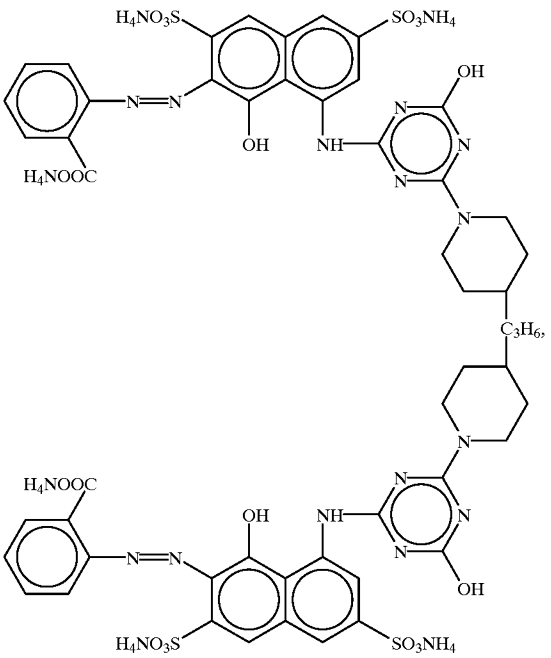

-continued
Compound 4:
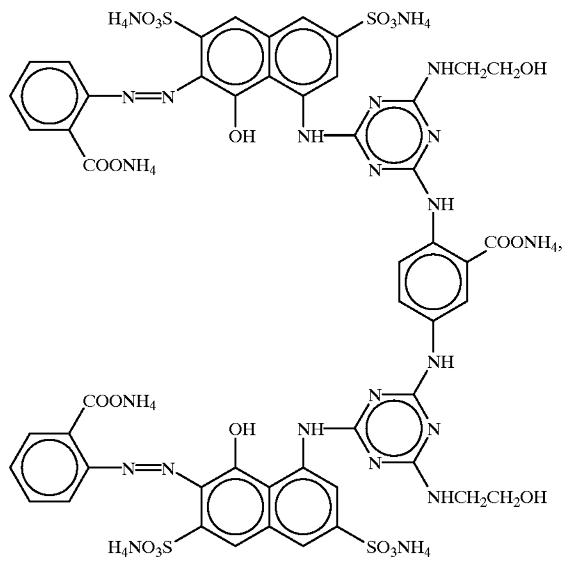
Compound 5:
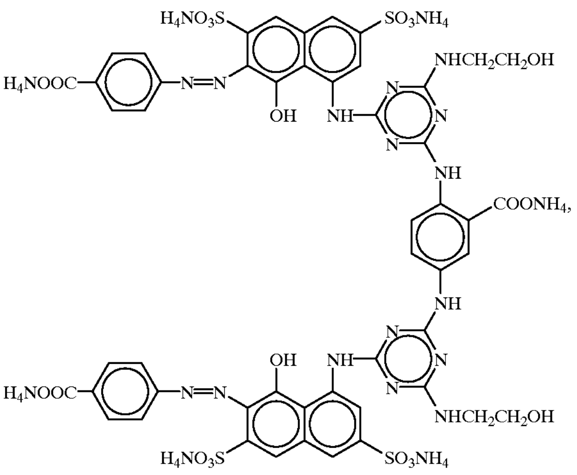
-continued
Compound 6:
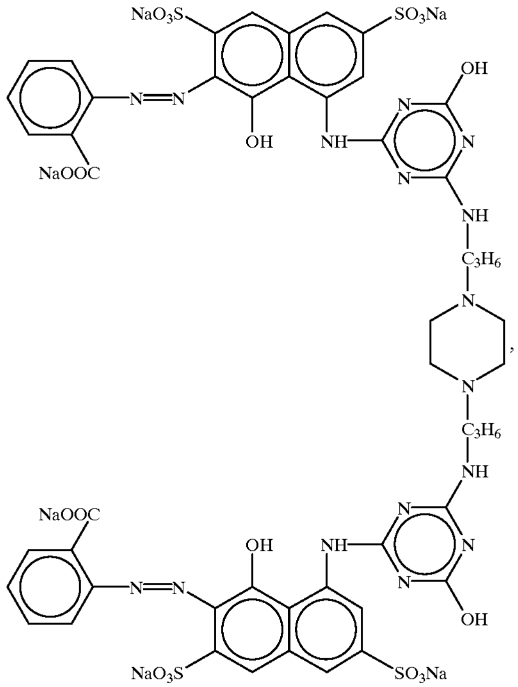
Compound 7:
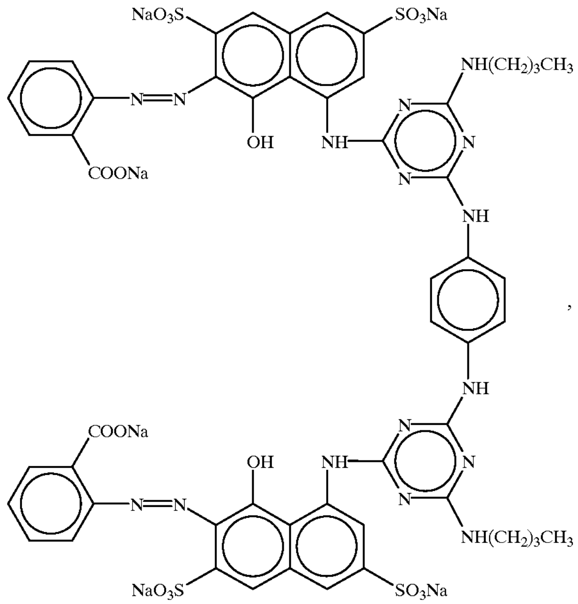

-continued
Compound 8:
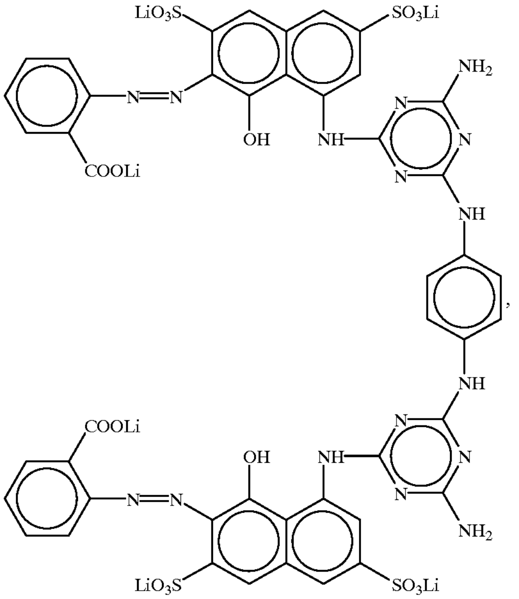
,
Compound 9:
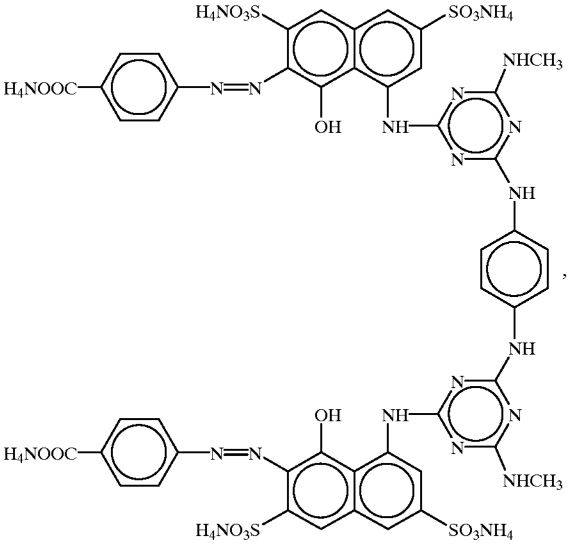
,
-continued
Compound 10:
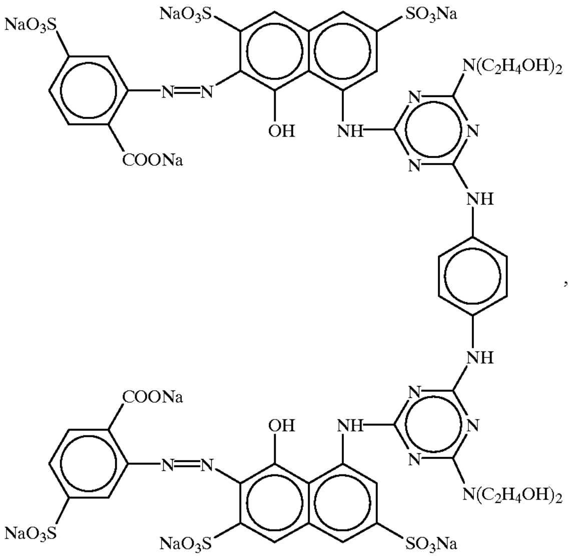
,
and
Compound 11:
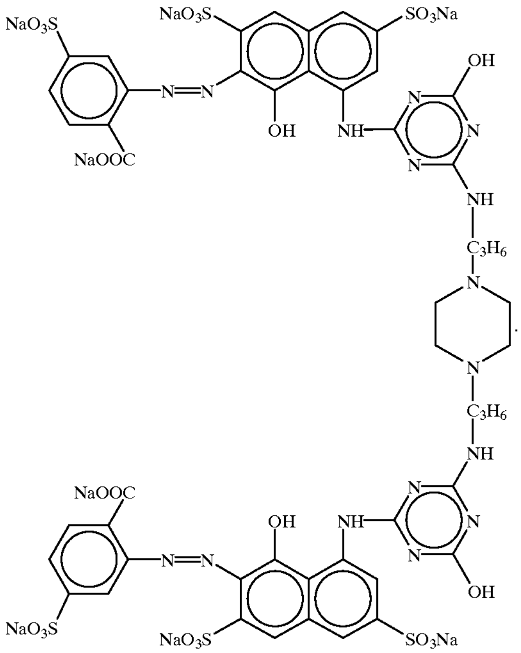
.

In the present invention, when a water-soluble magenta dye of the formula (V) as mentioned above having an anionic group is used as a colorant for ink, the image, which is obtained by the process for the formation of an image which comprises the step (A) in which a liquid composition comprising a cationic substance is applied to a recording medium and the step (B) in which an ink is applied to the recording medium by ejecting the ink as droplets from an orifice according to signals, can readily satisfy wholly the color sense represented by the equations:

$$\sqrt{(a_1^*)^2+(b_1^*)^2} \geqq \sqrt{(a_0^*)^2+(b_0^*)^2} \quad \text{(I)},$$

$$40 \leqq L_1^* \leqq 80 \quad \text{(II)},$$

$$50 \leqq a_1^* \leqq 70 \quad \text{(III), and}$$

$$-30 \leqq b_1^* \leqq 5 \quad \text{(IV)},$$

where in the formulae (I), (II), (III) and (IV), $L_1^*$, $a_1^*$, $b_1^*$, $a_0^*$ and $b_0^*$ each represent a colorimetric value which is defined in the CIE 1976 (L*a*b*) color space; $a_1^*$ and $b_1^*$ each represent a colorimetric value of the image, which is obtained by using the process for the formation of an image comprising steps (A) and (B) and $a_0^*$ and $b_0^*$ each represent a colorimetric value of the image, which is obtained by using the process for the formation of an image comprising only step (B).

The water-soluble dye as mentioned above may be contained in the ink used in the present invention not only as one dye, but also as two or more dyes for adjusting the color tone. An amount of the water-soluble dye to he added in the ink is within a range of from 0.1 to 15% by weight, more preferably from 1 to 10% by weight based on the total weight of the ink.

The ink used in the present invention contains as a colorant the anionic water-soluble magenta dye as mentioned above. However, it is preferred to contain further a liquid medium for dissolving the water-soluble dye. As a liquid medium, there is mentioned water or a mixed solvent of water and an organic solvent, and especially preferably a mixed solvent of water and organic water-soluble solvent, which may prevent the ink from drying. It is desirable to use deionized water containing no ions, not a common water containing various ions.

As water-soluble organic solvents, for example, there are mentioned alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol and iso-butyl alcohol, n-pentanol and the like; amides such as dimethylformamide, dimethylacetamide and the like; ketones or ketone alcohol such as acetone, diacetone alcohol and the like; ethers such as tetrahydrofuran, dioxane and the like, oxyethylene or oxypropylene copolymers such as diethylene glycol, triethylene glycol, tetraethylene glycol, dipropylene glycol, tripropylene glycol, polyethylene glycol, polypropylene glycol and the like; alkylene glycols, whose alkylene radical contains 2 to 6 carbon atoms, such as ethylene glycol, propylene glycol, trimethylene glycol, triethylene glycol, hexylene glycol and the like; 1,2,6-hexanetriol; glycerol; trimethylol ethane and trimethylol propane; lower alkyl ethers of polyhydric alcohol such as ethylene glycol monomethyl (or ethyl) ether, diethylene glycol monomethyl (or ethyl) ether, triethylene glycol monomethyl (or ethyl) ether and the like; lower dialkyl ethers of polyhydric alcohol such as triethylene glycol dimethyl (or ethyl) ether, tetraethylene glycol dimethyl (or ethyl) ether and the like; alkanolamines such as monoethanol-, diethanol- and triethanolamine and the like; sulforane, N-methyl-2-pyrrolidone, 2-pyrrolidone, 1,3-dimethyl-2-imidazolidinone, etc.

The content of the organic water-soluble solvent as mentioned above in the ink used in the present invention is in general within a range of from 1 to 49% by weight, preferably from 2 to 30% by weight, based on the total weight of the ink. The organic water-soluble solvent may be used alone or as a mixture thereof. An amount of water in the ink used in the present invention is within a range of from 50 to 98% by weight, preferably 60 to 90% by weight, based on the total weight of ink.

The ink used in the present invention may contain, other than the above mentioned components if needed, additives such as a viscosity modifier, a preservative, an antioxidant, a pH-modifier, an antifoaming agent, a nonionic surfactant such as an ethylene oxide-adduct of acetylene glycol, an agent for preventing the nozzle from drying such as urea, and the like, as appropriate.

Further, other than components illustrated as above, an anionic compound such as, for example, an anionic surfactant and an anionic polymer, may be added to the ink.

There may be added to the ink an amphoteric surfactant, upon adjusting a pH-value below its isoelectric point. As examples of anionic surfactants being used for this purpose, there may be used preferably those being commonly used, such as a carboxylic acid salt, a sulfuric acid ester, a sulfonic acid salt or a phosphoric acid ester type and the like. As examples of anionic polymeric substances, there may be mentioned resins of alkali-soluble type, in particular, sodium polyacrylate or high molecular substances a part of which is copolymerized with acrylic acid, and the like, but of course not being limited thereto.

Preferable physical properties of the ink used in the present invention are as follows: a pH-value at near 25° C. being within a range of from 3 to 12, preferably from 5 to 11, a surface tension being within a range of from 10 to 60 dyn/cm, preferably from 15 to 50 dyn/cm, and a viscosity being within a range of from 1 to 30 cP, preferably from 1 to 10 cP.

The liquid composition used in the present invention will be explained. The liquid composition of the present invention contains at least a cationiw substance. As the cationic substance to be used, a cationic polymer having a weight average molecular weight ranging from 400 to 1,400 is preferred.

The reason is as follows: the cationic polymer having a weight average molecular weight ranging from 400 to 1,400 is very highly soluble in water and an aqueous solution of the polymer is low in viscosity, so that the liquid composition is unlikely to adhere to the tip of a nozzle, even when the evaporation of water occurs at a tip of the nozzle, and initial and evaporation viscosities of the liquid composition can be suppressed to be lower. As a result, the reliability in an ink-jet recording, such as an anti-fixing property, a frequency response property of ejection, a start-up property and the like, may be insured.

As examples of the cationic polymers, there are mentioned specifically polyallylamine, polyaminesulfone and copolymers thereof, polyvinylamine and the like; among these polymers, polyallylamine is used preferably in the present invention, which can be especially readily modified in the molecular weight and molecular weight distribution. The weight average molecular weight used herein means a weight average molecular weight measured by means of GPC using polyethylene glycol as a standard.

The liquid composition used in the present invention is prepared by dissolving a cationic substance such as the cationic polymer as mentioned above in an aqueous medium. A concentration of cationic substance in the aqueous medium is generally within a range of from about 1 to 20% by weight, preferably from about 2 to 6% by weight. When the concentration of cationic substance is too high, the viscosity of the resulting liquid composition also becomes too high. On the other hand, when the concentration of the cationic substance is too low, the water fastness of images on a recording medium is not sufficient.

The aqueous medium to dissolve the cationic substance is water and a mixed solvent of water and water-soluble organic solvent and it is preferable to use ion-exchanged water (deionized water), not a common water containing various ions.

As a water-soluble organic solvent, it is possible to use the same substance as used for the above mentioned ink.

The content of water-soluble organic solvent is within a range of from 3 to 50% by weight, preferably from 3 to 40% by weight, based on the total weight of liquid composition. A content of water is within a range of from 10 to 90% by weight, preferably from 30 to 80% by weight, based on the weight of liquid composition.

An amine having 8 or more carbon atoms may be more preferably contained in the liquid composition of the present invention. It is further more preferable to use a quaternary amine among amines as mentioned above. Due to containing the amine in the ink, the life of a thermal head in an ink-jet recording device is remarkably extended and the ejection stability of an ink containing a liquid composition and a colorant can be ensured for a long period of time, though the reason is not yet clarified theoretically.

As examples of these quaternary amines, there are mentioned a quaternary ammonium salt type compounds such as lauryltrimethyl ammonium chloride, lauryldimethylbenzyl ammonium chloride, benzyl-tributyl ammonium chloride, benzalkonium chloride and the like; a pyridinium salt type compound such as cetylpyridinium chloride, cetylpyridinium bromide and the like; among these compounds, benzalkonium chloride is especially preferred. A concentration of a quaternary amine in the liquid composition is generally within a range of from about 0.1 to 5% by weight, preferably from about 0.2 to 2% by weight.

The pH value of the liquid composition used in the present invention is preferably within a range of from 3 to 10, more preferably from 5 to 9. As a pH-modifier to provide such a pH value range, there are mentioned acids such as acetic acid, hydrochloric acid, p-toluene sulfonic acid, lactic acid, propionic acid and the like, but not being limited thereto. The surface tension of the liquid composition according to the present invention is preferably within a range of from 25 to 50 dyn/cm, more preferably from 30 to 40 dyn/cm.

The viscosity of the liquid composition is within a range of from 1.3 to 5 cP, more preferably from 1.5 to 3 cP.

As a recording medium used in the process for the formation of an image according to the present invention, there may be used preferably so-called plain paper such as, for example, copying paper, bond paper and the like, conventionally used, without any limitation. In particular, a white plain paper is preferred, which has a whiteness of 78 to 84 (Hunter Whitenessmeter; according to JIS P 8123) and a CIE 1976 ($L^*a^*b^*$) chromaticity represented by the formulae:

$$86 \leqq L^* \leqq 93,$$

$$3 \leqq a^* \leqq 10, \text{ and}$$

$$-6 \leqq b^* \leqq 1.$$

Certainly, a coated paper, which is manufactured especially for ink-jet recording, and a transparent film for OHP may be used preferably. A common wood free paper and a glossy paper may be also used.

The process for the formation of an image according to the present invention comprises the step (A) in which a liquid composition containing at least a cationic substance is applied to a recording medium and the step (B) in which an ink containing at least an anionic substance is applied to the recording medium; the step (A) aims at improving the letter quality and the fixing property of the recorded image formed by the step (B), preventing the bleeding and increasing the water fastness of images. The step (A) may be carried out before or after the step (B) because the cationic substance in the liquid composition and the anionic substance in the ink are mixed on the recording medium to form coagulates even when either step is carried out previously. From the viewpoint of increasing the image optical density and the fixing property, it is more preferable to carry out the step (A) after the step (B) and then successively carry out the step (B).

In case of carrying out the step (A) after the step (B), an interval from the time when the liquid composition is applied to a recording medium until the ink is applied thereto is not critical, but it is preferably within several seconds, especially preferably within one second in order to realize the present invention more effectively. This may be applied similarly to the case of carrying out the step (A) after the step (B).

As the process for applying the ink and liquid composition to a recording medium, there may be used various kinds of ink-jet systems, and especially preferably the bubble-jet system of the so-called on-demand type, in which droplets are ejected by means of bubbles generated by thermal energy.

Figure 2:
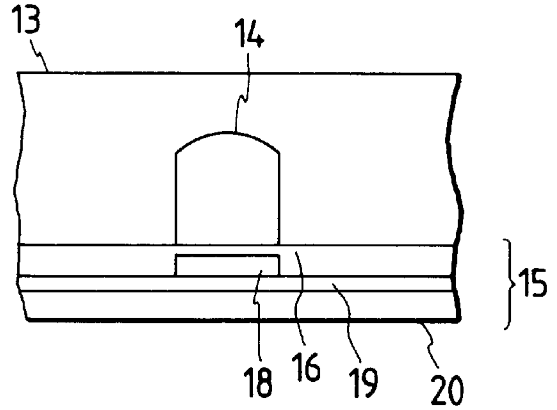
FIG. 2 is a transverse cross section of the head assembly of an ink-jet recording apparatus.
Figure 3:
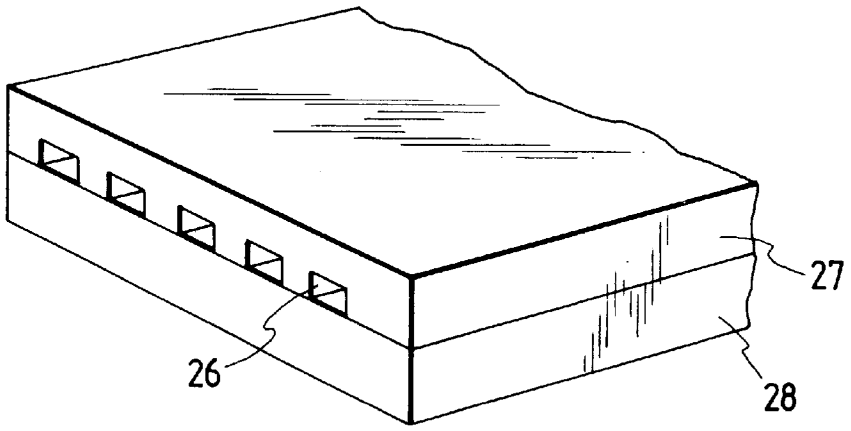
FIG. 3 is a perspective illustration of a multi-head assembly comprised of the head assembly shown in FIG. 1 (a perspective illustration of a head assembly of an ink-jet recording apparatus)

An example of an ink-jet recording apparatus preferable for the recording carried out using inks used in the present invention, will be described below. FIGS. 1, 2 and 3 show examples of the construction of the recording head, which is a main component of the apparatus. FIG. 1 is a cross-sectional view of the head 13 along its ink flow path, and FIG. 2 is a cross-sectional view,along the line 2—2 in FIG. 1.

A head 13 is formed by bonding a glass, ceramic or plastic plate or the like provided with an ink flow path 14, to a heating head 15 used in thermal recording (the drawing shows a thin-film head, to which, however, the invention is not limited). The heating head 15 is comprised of a protective film 16 formed of silicon oxide or the like, aluminum electrodes 17-1 and 17-2, a heating resistor layer 18 formed of nichrome or the like, a heat accumulating layer 19, and a substrate 20 with good heat dissipation properties, made of alumina or the like.

As shown in FIG. 1, a recording ink 21 reaches an ejection orifice 22 and a meniscus 23 is formed there by a pressure P.

Now; upon application of electric signals to the aluminum electrodes 17-1 and 17-2, heat is abruptly generated at the region denoted by n in the thermal head 15, so that bubbles are generated in the ink 21 coming into contact with this region. The pressure thus produced thrusts out the meniscus 23 and the ink 21 is ejected from the orifice 22 in the form of minute ink drops 24 to a recording medium 25.

FIG. 3 schematically illustrates a multi-head comprising the head as shown in FIG. 1 arranged in a large number. This multi-head is prepared by closely bonding a glass plate 27 having multiple flow paths 26, to a heating head 28 similar to the head as illustrated, in FIG. 1.

Figure 4:
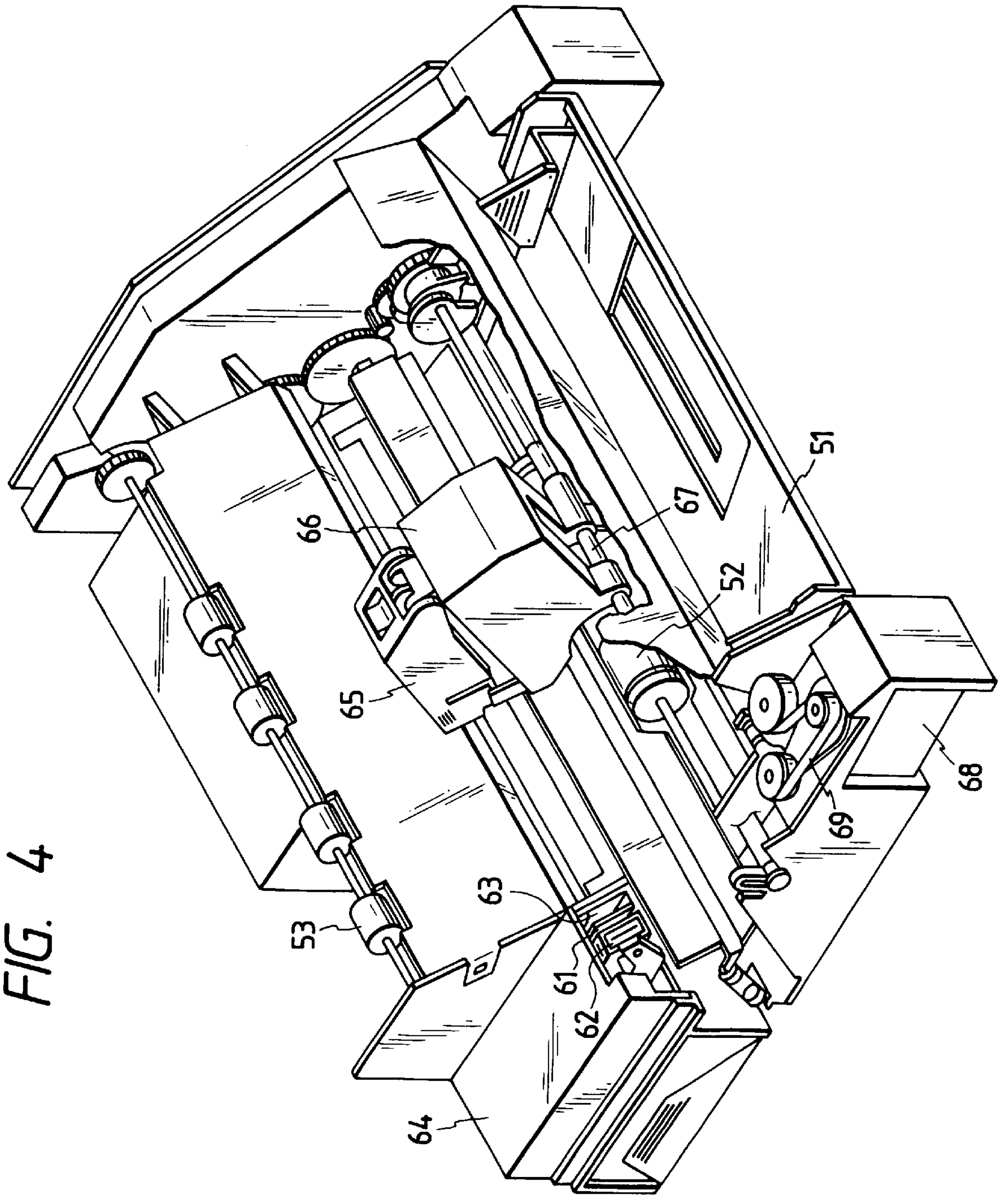
FIG. 4 is a perspective illustration of an example of an ink-jet recording apparatus.

FIG. 4 shows an example of the ink-jet recording apparatus in which such a head has been incorporated. In FIG. 4, reference numeral 61 denotes a blade serving as a wiping member in the form of a cantilever, one end of which is a stationary end retained by a blade-retaining member. The blade 61 is provided at the position adjacent to the region in which the recording head 65 makes a record. In the present example, the blade is retained in such a form that it protrudes into the path through which the recording head 65 is moved.

Reference numeral 62 denotes a cap for the face of ink ejection openings of the recording head 65, which is provided at the home position adjacent to the blade 61, and is so constituted that it moves in the direction perpendicular to the direction in which the recording head 65 is moved and comes into contact with the face of ink ejection openings to carry out capping. Reference numeral 63 denotes an ink absorber provided adjoiningly to the blade 61, and, similar to the blade 61, is retained in such a form that it protrudes into the path through which the recording head 65 is moved.

The above blade 61, cap 62 and absorber 63 constitute an ejection restoration assembly 64, where the blade 61 and the absorber 63 remove water, dust and so forth from the ink ejection opening face.

Reference numeral 65 denotes the recording head having an ejection energy generating means and ejects ink to the recording medium set opposite the ejection opening face provided with ejection openings, to carry out recording. Reference numeral 66 denotes a carriage on which the recording head 65 is mounted so that the recording head 65 can be moved.

The carriage 66 is slidably associated with a guide shaft 67. Part of the carriage 66 is connected (not shown) with a belt 69 driven by a motor 68. Thus, the carriage 66 can be moved along the guide 67 and hence the recording head 65 can be moved from a recording region to a region adjacent thereto.

Reference numeral 51 denotes a feeding part from which recording mediums are inserted, and 52, a feed roller driven by a motor (not shown). With such construction, the recording medium is fed to the position opposite the ejection opening face of the recording head 65, and, with progress of recording, outputted from an output section provided with an output roller 53.

In the above constitution, the cap 62 of the head restoration assembly 64 is receded from the path of motion of the recording head 65 when the recording head 65 is returned to its home position, e.g., after completion of recording, and the blade 61 stands protruded into the path of motion. As the result, the ejection opening face of the recording head 65 is wiped. When the cap 62 comes into contact with the ejection opening face of the recording head 65 to carry out capping, the cap 62 it moved in such a way that it protrudes into the path of motion of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 5:
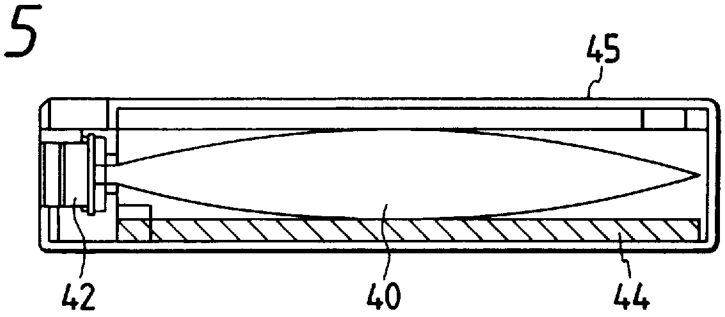
FIG. 5 is a longitudinal cross section of an ink cartridge.

FIG. 5 shows an example of an ink cartridge, denoted as 45, that has held the ink being fed to the head through an ink-feeding member, e.g., a tube. Here, reference numeral 40 denotes an ink holder, e.g., an ink bag, that has held the feeding ink. The top thereof is provided with a stopper 42 made of rubber. A needle (not shown) may be inserted to this stopper 42 so that the ink in the ink holder 40 can be fed to the head. Reference numeral 44 denotes an absorber that receives waste ink.

In the present invention, it is preferable for the ink holder to be formed of a polyolefin, especially polyethylene, at its face coming into contact with ink.

Figure 6:
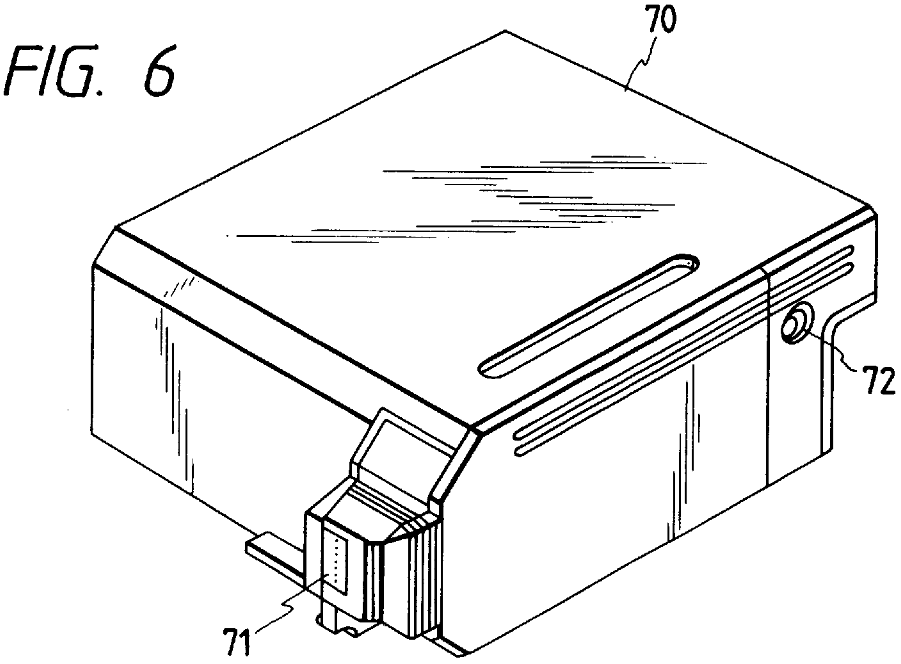
FIG. 6 is a perspective illustration of an example of a recording unit.

The ink-jet recording apparatus used in the present invention is not limited to the apparatus as described above in which the head and the ink cartridge are separately provided, and a device can also be preferably used in which these are integrally formed as shown in FIG. 6.

In FIG. 6, reference numeral 70 denotes a recording unit, in the interior of which an ink absorber that has held an ink is contained. The recording unit is so constructed that the ink in such an ink absorber is ejected in the form of ink droplets from a head 71 having a plurality of orifices.

As a material for the ink absorber, it is preferable in the present invention to use, for example, polyurethane. Reference numeral 72 denotes an air path opening through which the interior of the cartridge is made to communicate with the atmosphere. This recording unit 70 can be used in place of the recording head shown in FIG. 3, and is detachably mounted to the carriage 66.

In the foregoing description, the recording apparatus used in the present invention is exemplified by the ink-jet recording apparatus in which heat energy is caused to act on the ink to eject ink droplets. It is also possible to use a piezo type ink-jet recording apparatus employing a piezoelectric device.

Figure 7:
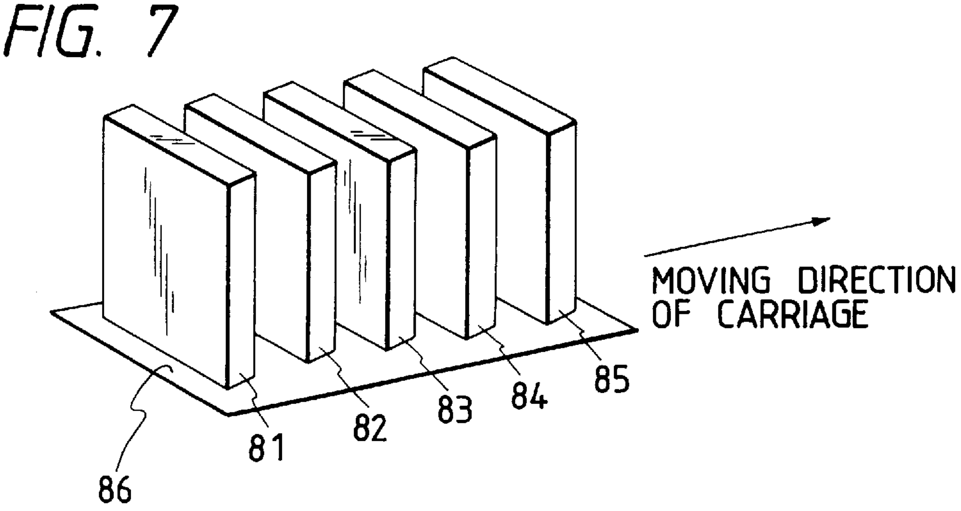
FIG. 7 is a perspective illustration of the recording section in which a plurality of recording heads used in the present invention are arranged.

In a case of performing color recording, a recording apparatus in which five recording heads comprising the recording head as previously shown in FIG. 3 are arranged on a carriage is used, for example. FIG. 7 shows an example thereof. Reference numerals 81, 82, 83 and 84 denote recording heads for ejecting a yellow ink, a magenta ink, a cyan ink and a black ink which are used in the present invention, respectively, and reference numeral 85 denotes a recording head for ejecting the liquid composition. The heads are provided in the recording apparatus described above, and eject the inks of respective colors in accordance with recording signals. Reference numeral 86 denotes the carriage. Incidentally, the liquid composition is applied in advance at least to image-forming portions where inks will be applied to a recording medium.

Figure 8:
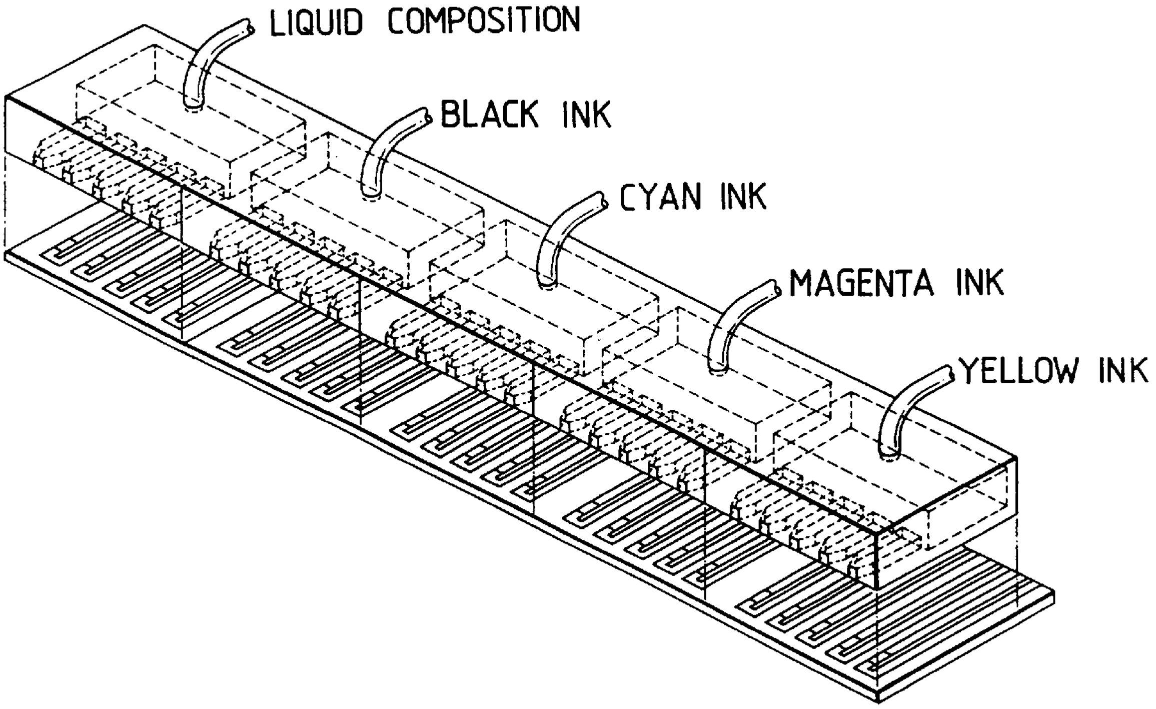
FIG. 8 is a perspective illustration of another recording head used in the present invention.

In FIG. 7, an example to use five recording heads is shown there, but the present invention is not limited thereto. It is also preferable to perform recording in such a manner that flow paths for a yellow ink, magenta, cyan and black inks and the liquid composition used in the present invention are separated in one recording head as shown in FIG. 8. Of course, the recording heads may be arranged in such a manner that the recording order of the inks and the liquid composition is reversed from the order as mentioned above.

Figure 9:
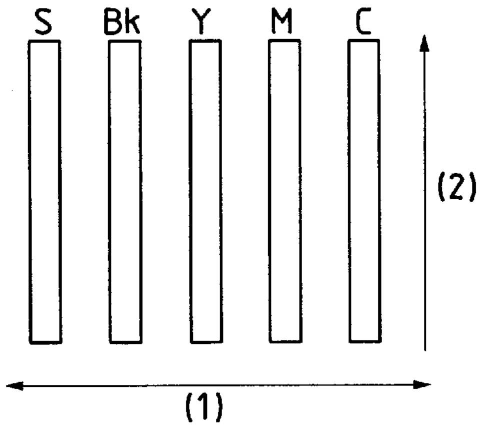
FIG. 9 shows an example of the first constitution of a recording head.
Figure 10:
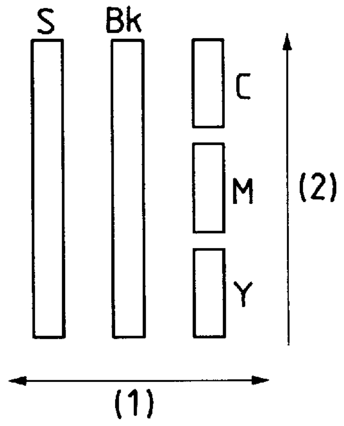
FIG. 10 shows an example of the second constitution of a recording head.
Figure 11:
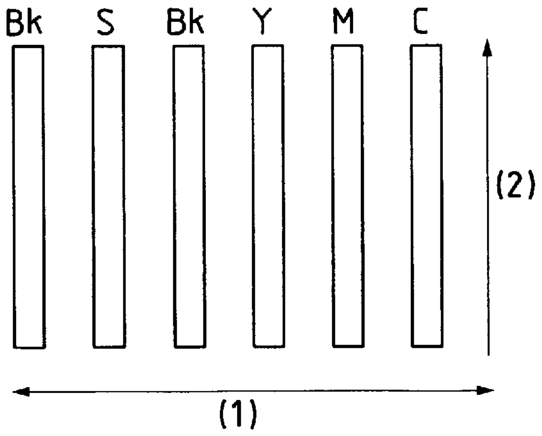
FIG. 11 shows an example of the third constitution of a recording head.

FIGS. 9 to 11 show three specific constitutional examples of ink-jet recording heads used preferably in the present invention.

In FIGS. 9 through 11, Y, M, C and Bk each shows a recording head for ejecting yellow, magenta, cyan and black inks, respectively. S is a recording head for ejecting the liquid composition. Every recording head is arranged on a carriage, though different in each constitutional example, as shown in FIG. 7. Each recording head is arranged in such a recording apparatus as mentioned above and ejects each color ink. The liquid composition is ejected at least to the image area, in advance of or after applying each ink to the recording medium. Each recording head is moved by the carriage in the direction of arrow (1) and the recording medium is moved by a paper-feeding roller etc. in the direction of arrow (2).

In the first constitutional example of FIG. 9, recording heads for S, Bk, Y, M and C are arranged in parallel on the carriage. The second constitutional example of FIG. 10 comprises the recording heads arranged in parallel for the liquid composition and black ink as well as the recording heads arranged in parallel to the above head and in series to each other for Y, M and C. The ejection volume per dot for each recording head is not necessarily the same and the ejection volume (Vd) may be adjusted by the composition of the liquid composition so as to optimize the recording aptitude. Preferably, the Vd's of S, Y, M and C are the same and the Vd of Bk is made twice thereof, but the invention is not limited thereto.

In the third constitutional example as shown in FIG. 11, each recording head having the same ejection volume for Bk, S, Bk, Y, M and C is arranged in parallel on the carriage and the ejection volume of black ink can be made twice of the ejection volume of other color inks and the liquid composition. The ejection volumes (Vd) of S, Bk, Y, M and C in this constitutional example of FIG. 11 are also not necessarily the same.

In the present invention, the ratio of applied amount per unit area on the recording medium in the image-forming region of the liquid composition to the ink of the present invention may be 1:1, but the ratio of liquid composition to the ink may be made in a range of from 1:10 to 8:10. So, a homogeneity of solid print obtained can be attained. The ratio of applied amount of the liquid composition per unit area of the recording medium in the image-forming region to the ink is adjusted by either one of the following methods. Specifically, for example, the number of pixels of the liquid composition applied to the recording medium is controlled within a range of from 10 to 80% of the number of pixels of the ink applied to the recording medium. Both the liquid composition and the ink are applied by an ink-jet recording system, and the ejection volume of the liquid composition is controlled so as to be less than the ejection volume of the ink. Or, the number of pixels of the liquid composition applied to the recording medium is controlled so as to be within the range of from 10 to 80% of the number of pixels of the ink applied to the recording medium and both the liquid composition and the ink are applied to the recording medium by an ink-jet recording system, in which the ejection volume of the liquid composition is controlled so as to be less than the ejection volume of the ink.

The present invention will be explained by Examples and Comparative Example in detail. Incidentally, all designations of "part" or "parts" and "%" as will be used in the following examples mean part or parts by weight and % by weight unless expressly noted.

EXAMPLE 1

The following components were mixed and dissolved, and the resulting solution was then filtered through a membrane filter having a pore size of 0.22 μm (Fluoroporefilter, trade name, product of Sumitomo Electric Industries Co.) under pressure to yield the ink and the liquid composition of Example 1.

<Ink 1>

- 2.5 parts of a dye of Compound 3,
- 7.5 parts of glycerol,
- 7.5 part of diethylene glycol,
- 7.5 parts of urea,
- 74.85 parts of water,
- 0.05 part of sodium hydroxide, and
- 0.1 part of acetylene glycol (Acetylenol EH; trade name; product of Kawaken Fine Chemicals Co., Ltd.).

<Liquid composition 1>

- 4 parts of polyallylamine (weight average molecular weight, Mw: 600),
- 1 part of benzalkonium chloride (G-50, trade name, product of Sanyo Chemical Co.),
- 5 parts of glycerol,
- 5 parts of thiodiglycol,
- 3 parts of acetic acid, and
- 83 parts of water.

Using the ink 1 and the liquid composition 1 obtained as mentioned above, recording was performed on a PB paper available from Canon Corp. (for copier and ink-jet recording). Images were formed by using a recording apparatus similar to the one shown in FIG. 4 as an ink-jet recording apparatus and using two recording heads among five recording heads as shown in FIG. 7. In this case, the liquid composition was ejected in advance on the recording paper and the ink was then applied thereon. The position where the liquid composition was applied to the recording paper (PB paper, available from Canon Corp., having Whiteness of 78.6 measured by a Hunter Whitenessmeter, in accordance with JIS P 8123 and Chromaticity of $L^*=89.2$, $a^*=6.8$ and $b^*=-2.4$) was adjusted to align exactly the position where the ink would be applied.

The recording head used herein had a recording density of 360 dpi and the drive frequency was 5 KHz. The ejection volume of ink per dot from the head was 80 pl/dot and that of the liquid composition was 40 pl/dot. Printing was performed under the environmental conditions of 25° C. and 55% RH.

EXAMPLE 2

<Ink 2>

- 2.5 parts of a dye of Compound 6,
- 7.5 parts of glycerol,
- 7.5 part of diethylene glycol,
- 7.5 parts of urea,
- 74.85 parts of water,
- 0.05 part of sodium hydroxide, and
- 0.1 part of acetylene glycol (Acetylenol EH, trade name; product of Kawaken Fine Chemicals Co., Ltd.).

Using the ink 2 composed of the components mentioned above prepared in the same manner as in Example 1 and the liquid composition 1 obtained in Example 1, recording was performed on a PB paper available from Canon Corp. (for copier and ink-jet recording) under the same conditions as in Example 1.

Comparative Example 1

<Ink 3>

- 2.5 parts of C.I. Acid Red 94,
- 7.5 parts of glycerol,
- 7.5 part of diethylene glycol,
- 7.5 parts of urea, 74.85 parts of water, 0.05 part of sodium hydroxide, and 0.1 part of acetylene glycol (Acetylenol EH, trade name; product of Kawaken Fine Chemicals Co., Ltd.).

Using the ink 3 composed of the components mentioned above prepared in the same manner as in Example 1 and the liquid composition 1 obtained in Example 1, recording was performed on a PB paper available from Canon Corp. under the same conditions as in Example 1.

<Evaluation Item>

Methods and criteria of evaluation are described as below. The results obtained are shown in Table 1.

1. Water Fastness:

Using inks and the liquid composition respectively, solid prints of 25.4×25.4 mm square (360 dpi) were printed on a PB paper available from Canon Corp. After the printed matters were left standing for one hour, the optical density was measured by means of Macbeth RD 915 (trade name, product of Macbeth Co.). Thereafter, the printed matter was dipped for 3 minutes in a vessel filled with tap water, and air-dried, and the printing density was measured again to obtain percent retention of optical density for the evaluation of water fastness.

$$\text{Percent retention of optical density of print sample} = \frac{\text{Optical density after immersion test}}{\text{Initial optical density}} \times 100$$

A: The percent retention of optical density of the print sample was at least 95%;

B: The percent retention of optical density of the print sample was not lower than 85%, but lower than 95%;

C: The percent retention of optical density of the print sample was lower than 85%.

2. Color Tone:

Using inks and the liquid composition respectively, solid prints of 25.4×25.4 mm square (360 dpi) were printed on a PB paper available from Canon Corp. After the printed matters were left standing for one hour, the color tone was measured visually under the criteria as below:

A: the printing density is homogeneous and color is clear;

B: the printing density is non-homogeneous, but color is clear;

C: the printing density is non-homogeneous, and color is dull.

3. Calculation of Equation (I):

Using inks and the liquid composition respectively, solid prints of 25.4×25.4 mm square (360 dpi) were printed on a PB paper available from Canon Corp. After the printed matters were left standing for one hour, the chromaticities of the printed matters were measured by means of a high speed spectrophotometer (CA-35, trade name, product of Murakami Shikisai Gijutsu Kenkyusho) to obtain values of $L_1^*$, $a_1^*$ and $b_1^*$.

As controls, using only inks respectively, solid prints of 25.4×25.4 mm square (360 dpi) were printed on a PB paper available from Canon Corp. After the printed matters were left standing for one hour, the chromaticities of the printed matters were measured by means of a high speed spectrophotometer (CA-35, trade name, product of Murakami Shikisai Gijutsu Kenkyusho) to obtain values of $L_0^*$, $a_0^*$ and $b_0^*$.

The values of $\sqrt{(a_1^*)^2+(b_1^*)^2}$ and $\sqrt{(a_0^*)^2+(b_0^*)^2}$ were calculated from the values of $a_1^*$, $b_1^*$, $a_0^*$ and $b_0^*$ obtained as above.

According to the present invention, as explained above, the recorded image has an excellent water fastness even when printed on a plain paper as a recording medium, and a clear magenta image having a very good coloristic property can be obtained in spite of using a liquid composition.

TABLE 1

| | Water fastness | Color tone | $\sqrt{(a_0^*)^2+(b_0^*)^2}$ | $\sqrt{(a_1^*)^2+(b_1^*)^2}$ | $L_0^*$ | $a_0^*$ | $b_0^*$ | $L_1^*$ | $a_1^*$ | $b_1^*$ |
|---|---|---|---|---|---|---|---|---|---|---|
| Example 1 | A | A | 58.39 | 58.45 | 46.4 | 58.2 | −4.7 | 46.6 | 58.4 | −2.3 |
| Example 2 | A | A | 56.58 | 58.53 | 48.6 | 56.3 | −5.6 | 47.3 | 58.5 | −1.9 |
| Comp. Example 1 | A | B | 68.88 | 66.39 | 48.9 | 65.5 | −21.3 | 48.2 | 61.7 | −24.5 |

What is claimed is:

1. A process for the formation of an image by using a liquid composition and a colored ink in combination to form a colored image on a recording medium, comprising the step of using at least a magenta ink as the colored ink, wherein said magenta ink provides an image of magenta color, which satisfies all color senses represented by the equations:

$$\sqrt{(a_1^*)^2+(b_1^*)^2} \geqq \sqrt{(a_0^*)^2+(b_0^*)^2} \quad \text{(I)},$$

$$40 \leqq L_1^* \leqq 80 \quad \text{(II)},$$

$$50 \leqq a_1^* \leqq 70 \quad \text{(III), and}$$

$$-30 \leqq b_1^* \leqq 5 \quad \text{(IV)},$$

where in the formulae (I), (II), (III) and (IV), $L_1^*$, $a_1^*$, $b_1^*$, $a_0^*$ and $b_0^*$ each represent a colorimetric value which is defined in the CIE 1976 (L*a*b*) color space; $a_1^*$ and $b_1^*$ each represent a colorimetric value of the image, which is obtained by using a liquid composition and a colored ink on a test paper having a whiteness of from 78 to 84, in accordance with JIS P 8123, measured by a Hunter Whitenessmeter, and a chromaticity of $86 \leqq L^* \leqq 93$, $3 \leqq a^* \leqq 10$ and $-6 \leqq b^* \leqq 1$, said chromaticity being defined in the CIE 1976 (L*a*b*) color space; and $a_0^*$ and $b_0^*$ each represent a colorimetric value of the image, which is obtained by using only a colored ink on said test paper;

wherein said magenta ink comprises a water-soluble dye represented by one of the following formulae:

-continued
Compound 1:
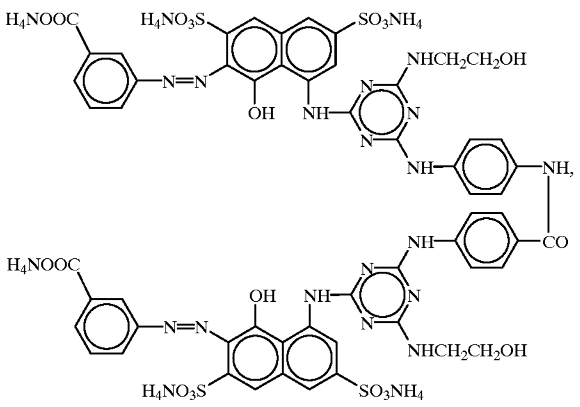
Compound 2:
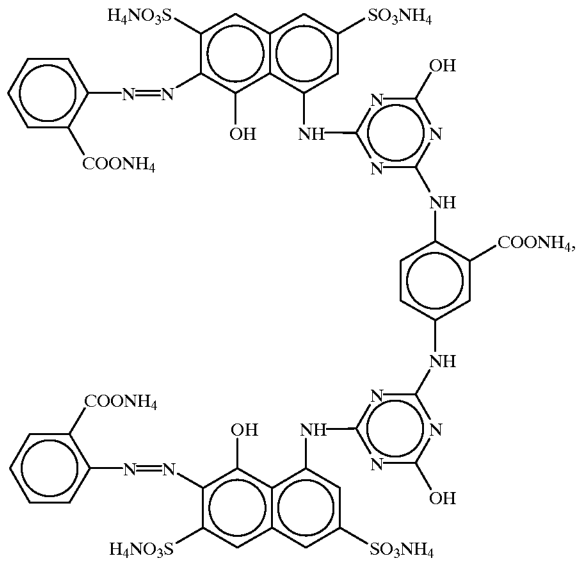
Compound 3:
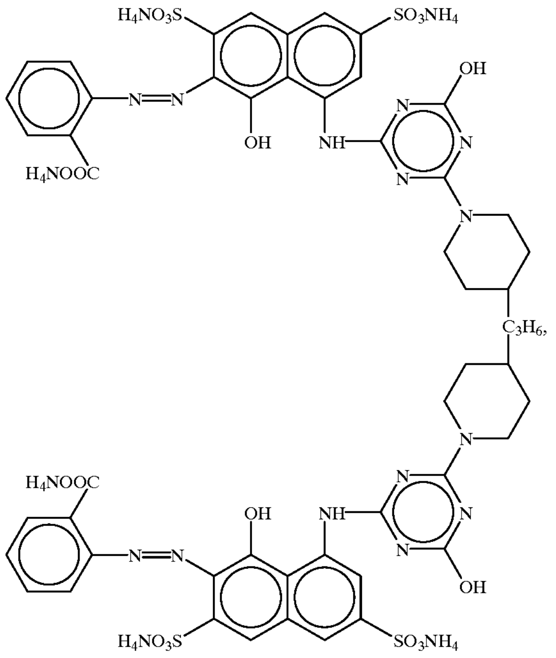
Compound 4:
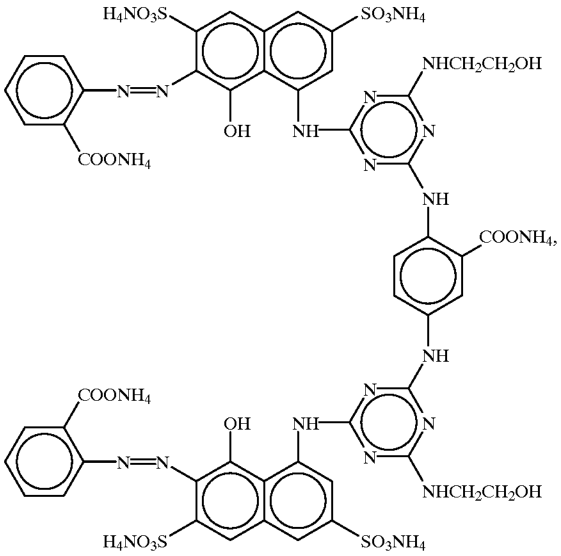

-continued
Compound 5:
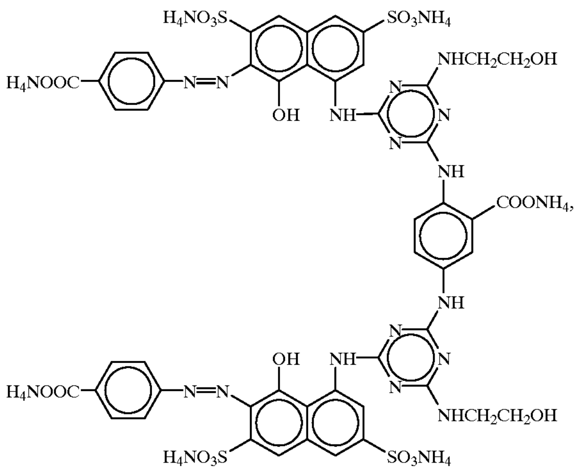
Compound 6:
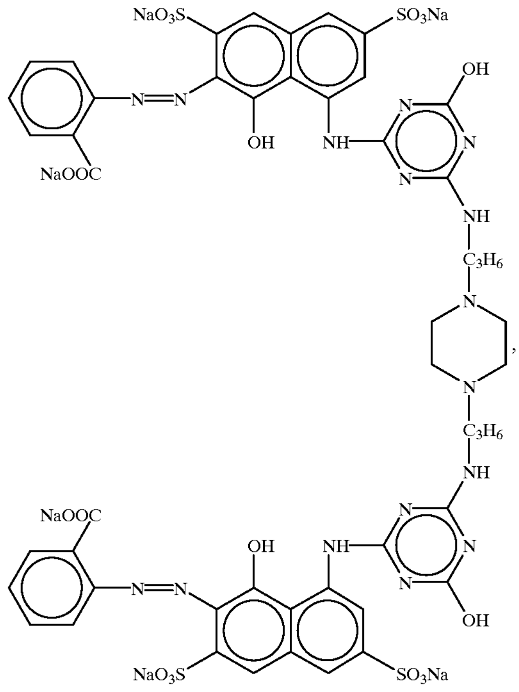
-continued
Compound 7:
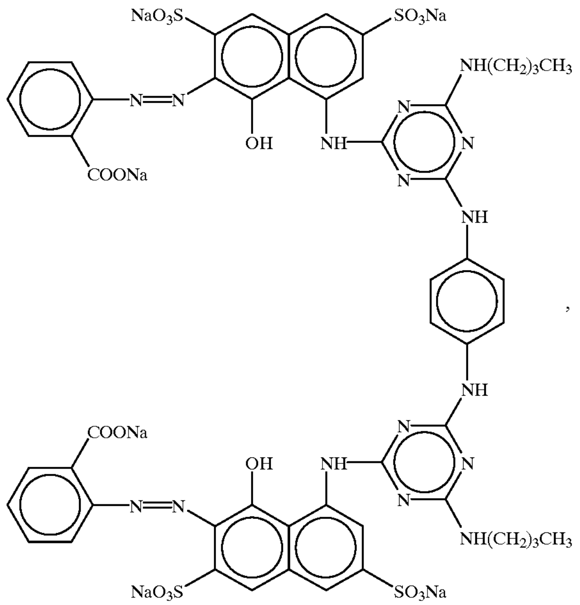
Compound 8:
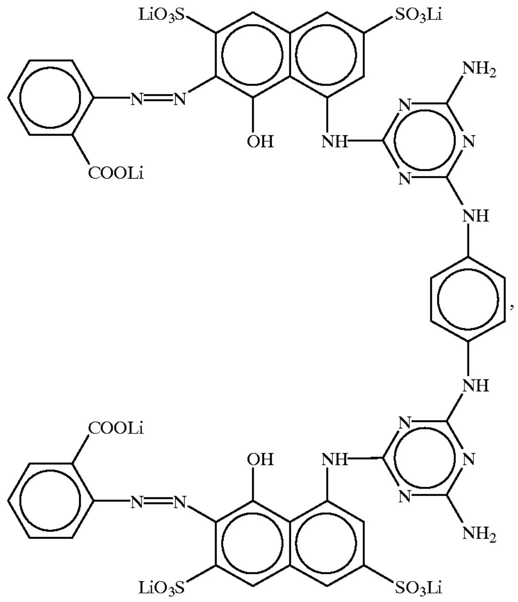

-continued

Compound 9:

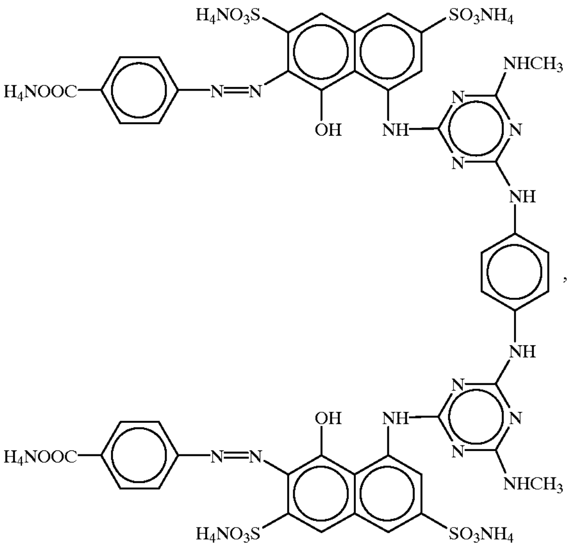

,

Compound 10:

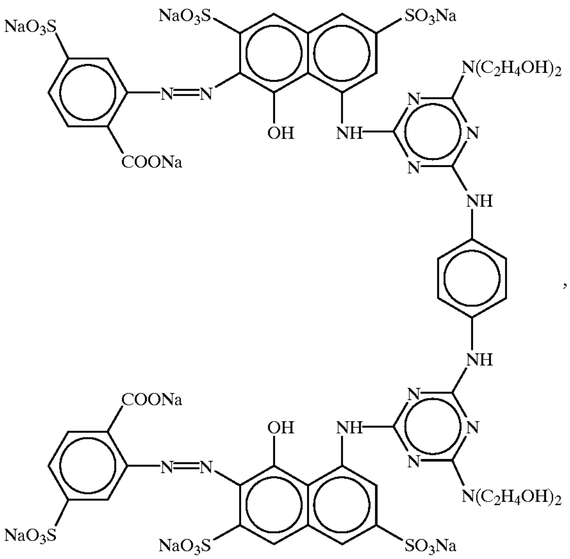

, and

-continued

Compound 11:

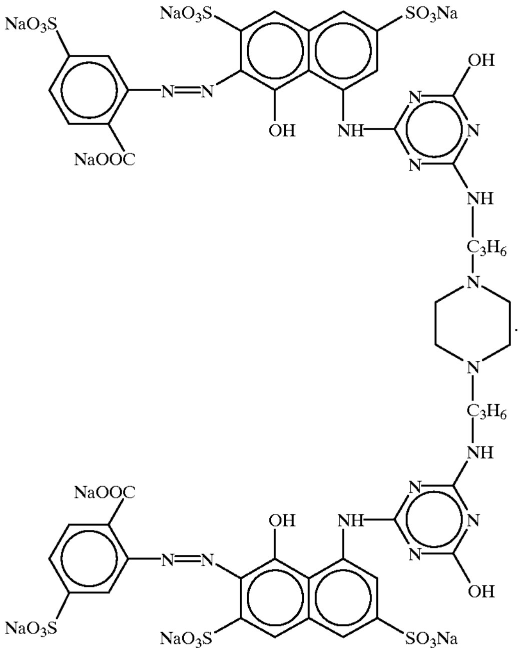

.

2. The process according to claim 1, wherein said liquid composition comprises a cationic substance.

3. The process according to claim 1, wherein said magenta ink comprises a water-soluble dye having an anionic group.

4. The process according to claim 1, wherein said liquid composition comprises water and at least one water-soluble organic solvent.

5. The process according to claim 3, wherein said magenta ink further comprises water and at least one water-soluble organic solvent.

6. The process according to claim 1, wherein said recording medium is a plain paper having a whiteness of from 78 to 84, measured in accordance with JIS P 8123, using a Hunter Whitenessmeter, and a chromaticity defined in the CIE 1976 (L*a*b*) color space within the range of $86 \leqq L^* \leqq 93$, $3 \leqq a^* \leqq 10$ and $-6 \leqq b^* \leqq 1$.

7. An ink-jet recording process for the formation of an image by using a liquid composition and a colored ink in combination to form a colored image on a recording medium, comprising the step of using at least a magenta ink as the colored ink, wherein said magenta ink provides an image of magenta color, which satisfies all color senses represented by the equations:

$$\sqrt{(a_1^*)^2+(b_1^*)^2} \geqq \sqrt{(a_0^*)^2+(b_0^*)^2} \quad \text{(I)},$$

$$40 \leqq L_1^* \leqq 80 \quad \text{(II)},$$

$$50 \leqq a_1^* \leqq 70 \quad \text{(III), and}$$

$$-30 \leqq b_1^* \leqq 5 \quad \text{(IV)},$$

where in the formulae (I), (II), (III) and (IV), $L_1^*$, $a_1^*$, $b_1^*$, $a_0^*$ and $b_0^*$ each represent a calorimetric value which is defined in the CIE 1976 (L*a*b*) color space; $a_1^*$ and $b_1^*$ each represent a colorimetric value of the image, which is obtained by using a liquid composition and a colored ink on a test paper having a whiteness of from 78 to 84, in accordance with JIS P 8123 measured by a Hunter Whitenessmeter, and a chromaticity of $86 \leqq L^* \leqq 93$, $3 \leqq a^* \leqq 10$ and $-6 \leqq b^* \leqq 1$, said chromaticity being defined in the CIE 1976 (L*a*b*) color space; and $a_0^*$ and $b_0^*$ each represent a colorimetric value of the image, which is obtained by using only a colored ink on said test paper;

wherein said magenta ink comprises a water-soluble dye represented by one of the following formulae:

Compound 1:

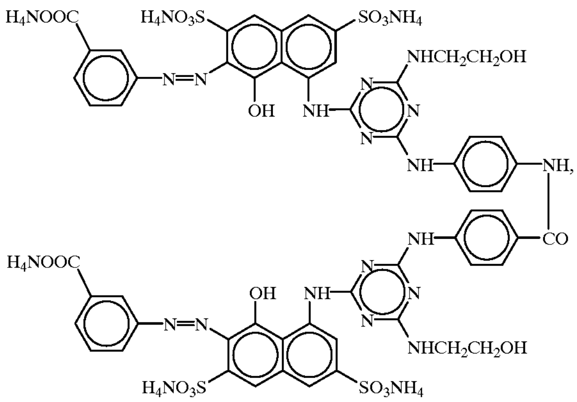

Compound 2:

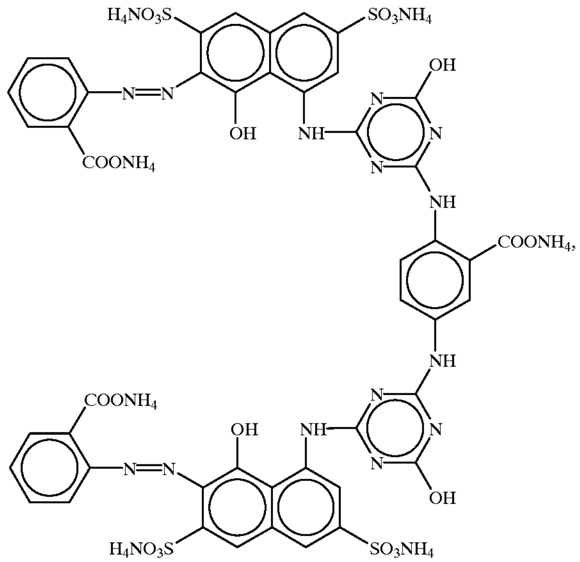

-continued

Compound 3:

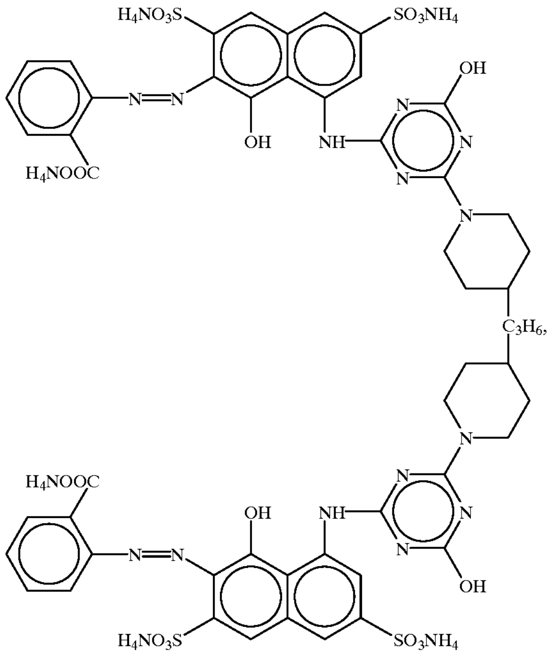

Compound 4:

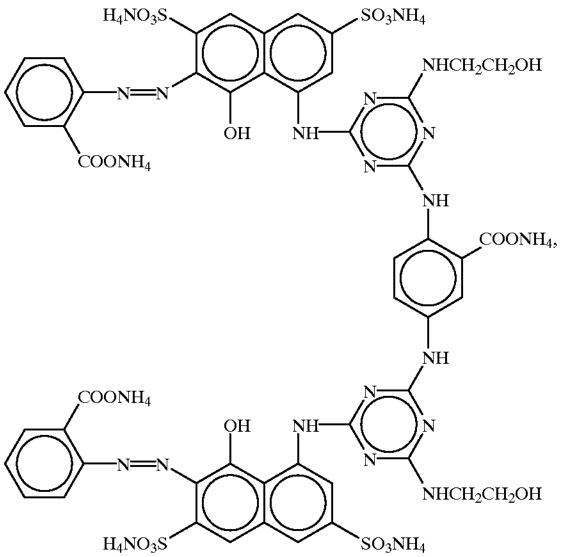

-continued
Compound 5:
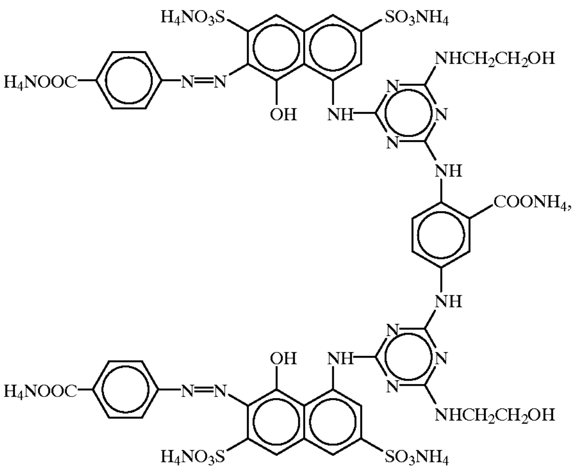
Compound 6:
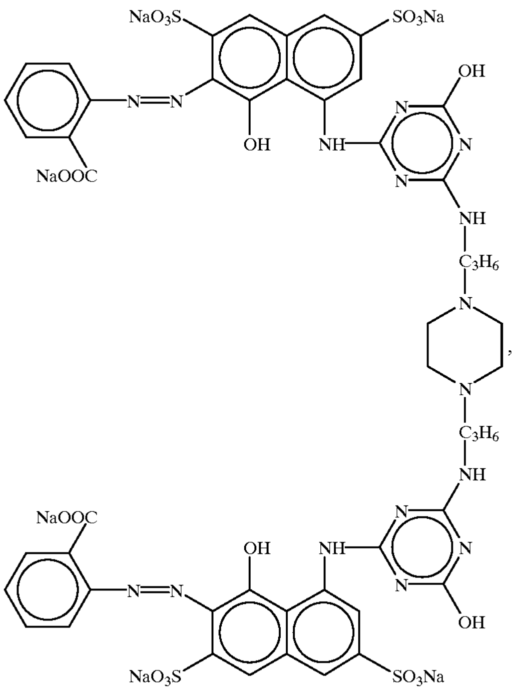
-continued
Compound 7:
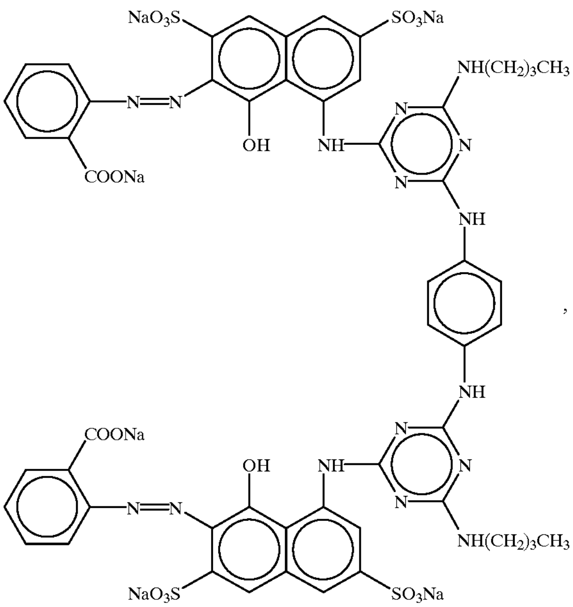
Compound 8:
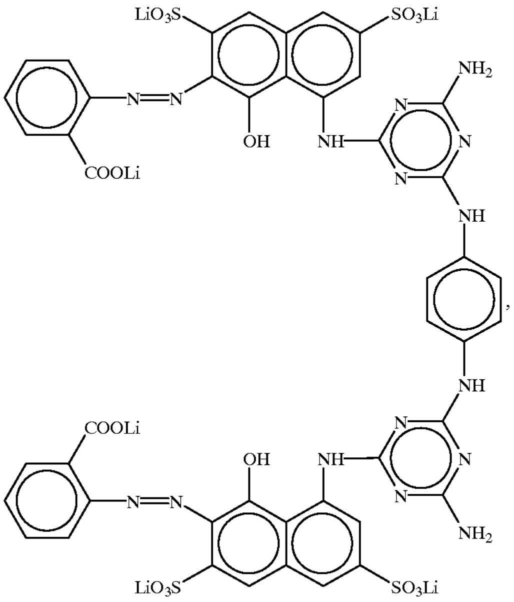

-continued

Compound 9:

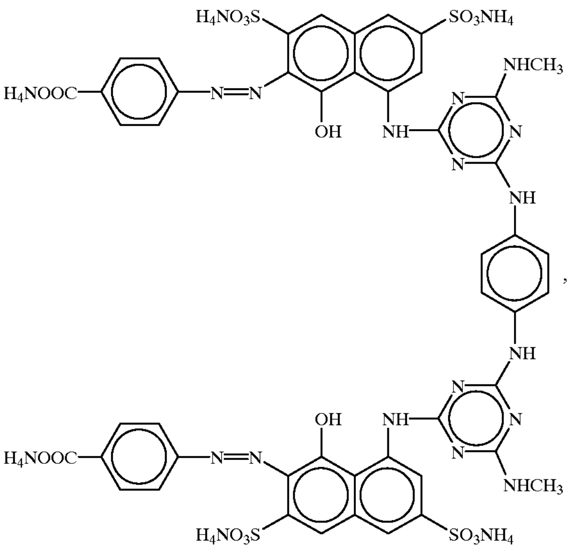

,

Compound 10:

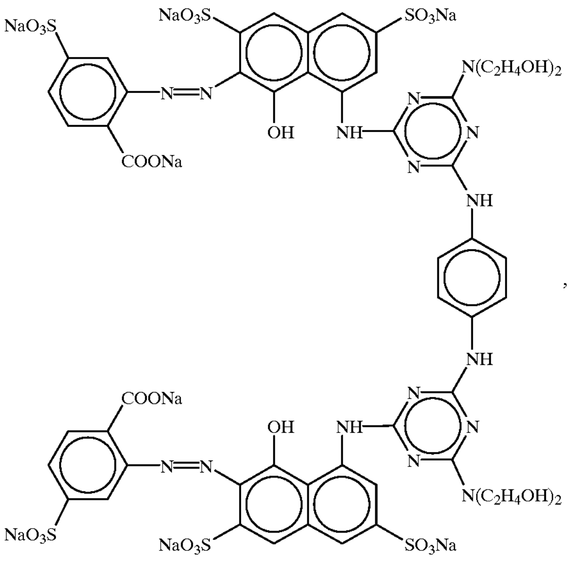

,

-continued and

Compound 11:

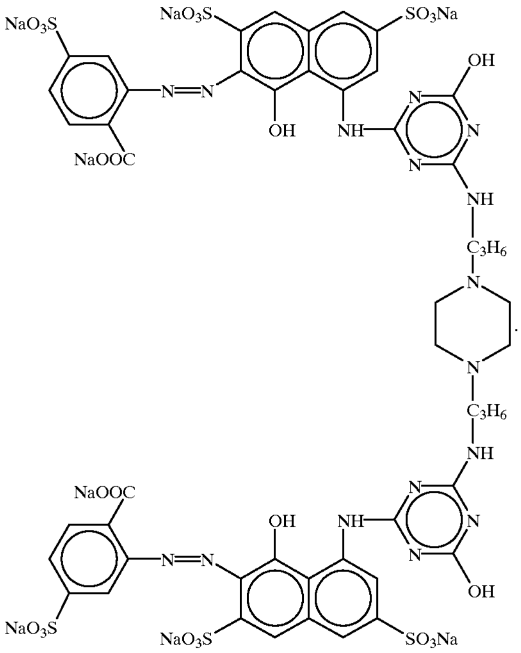

.

8. The ink-jet recording process according to claim 7, wherein said ink-jet process uses thermal energy.

9. The ink-jet recording process according to claim 7, wherein in addition to said magenta ink, a plurality of inks selected from a yellow ink, a cyan ink and a black ink is used.

10. The ink-jet recording process according to claim 7, wherein, prior to application of said magenta ink, said liquid composition is applied to said recording medium.

11. The ink-jet recording process according to claim 7, wherein said liquid composition is applied to said recording medium after applying said magenta ink thereto.

12. A process for recording an image comprising the steps of:

(i) providing an aqueous ink of magenta color comprising an anionic form of a water-soluble dye selected from the group consisting of dyes represented by the following formulae:

-continued
Compound 1:
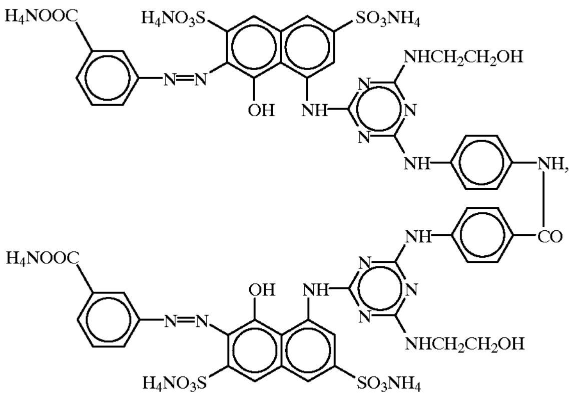
Compound 2:
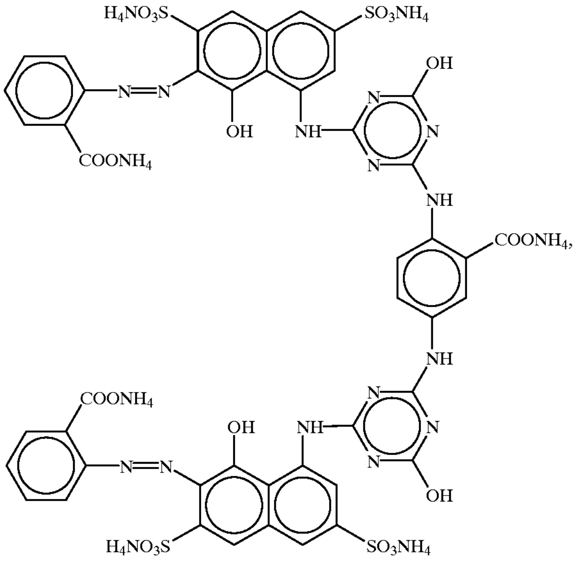
Compound 3:
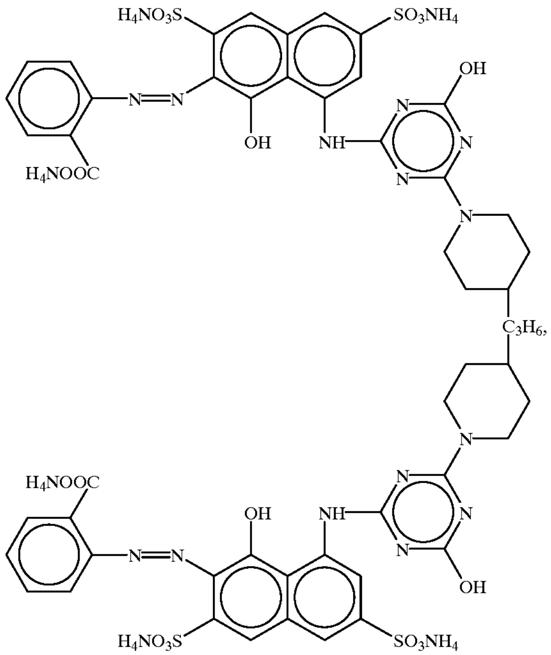
Compound 4:
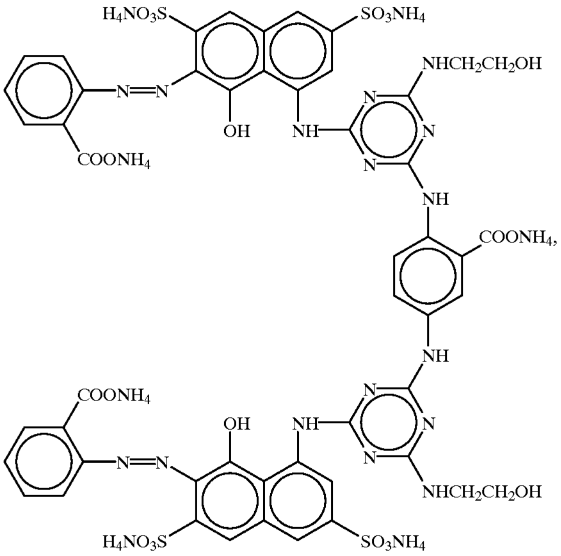

-continued
Compound 5:
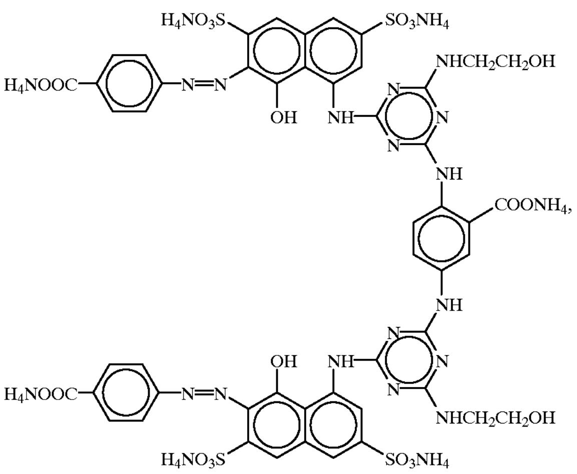
Compound 6:
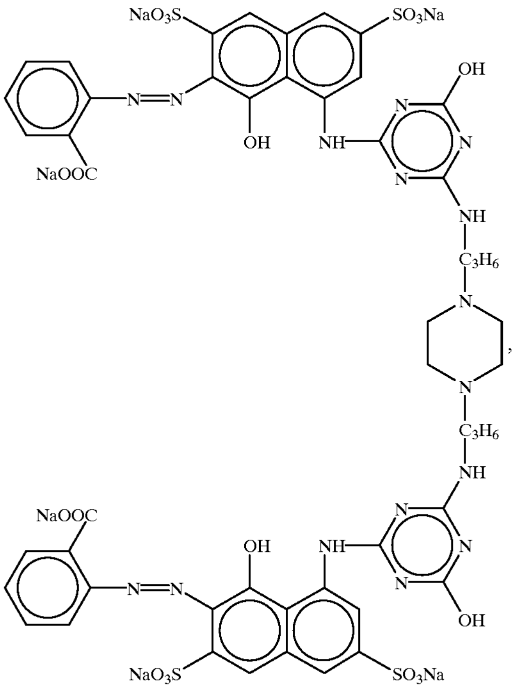
-continued
Compound 7:
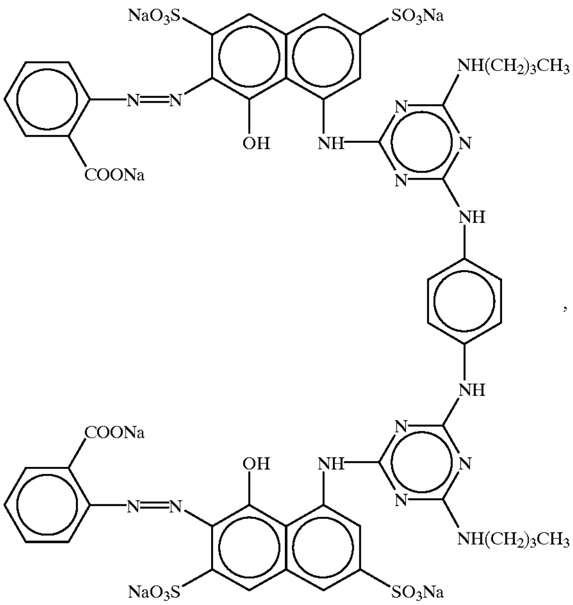
Compound 8:
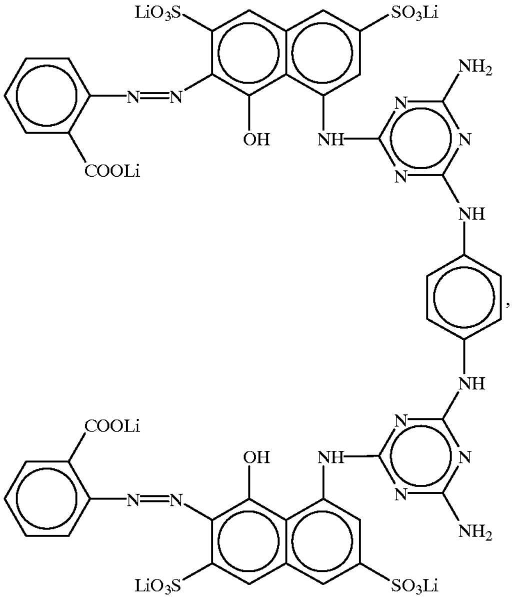

-continued

Compound 9:

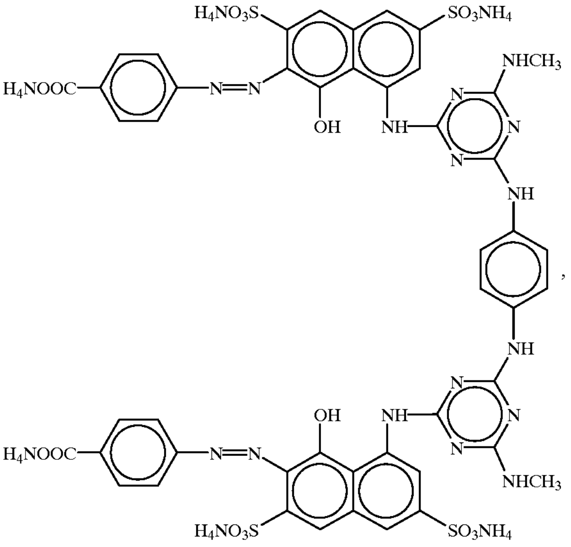

Compound 10:

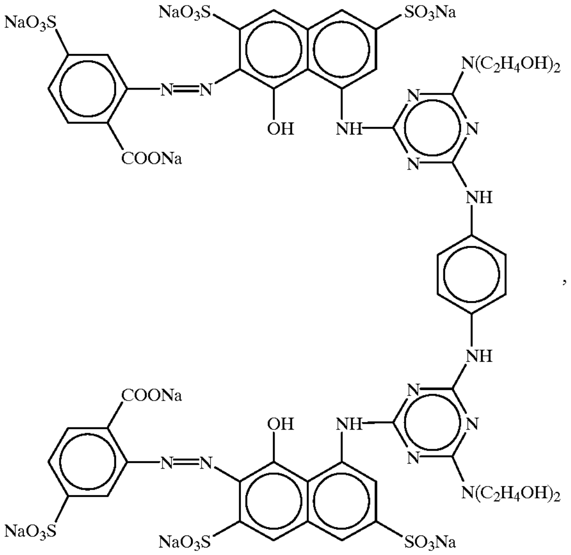

and

-continued

Compound 11:

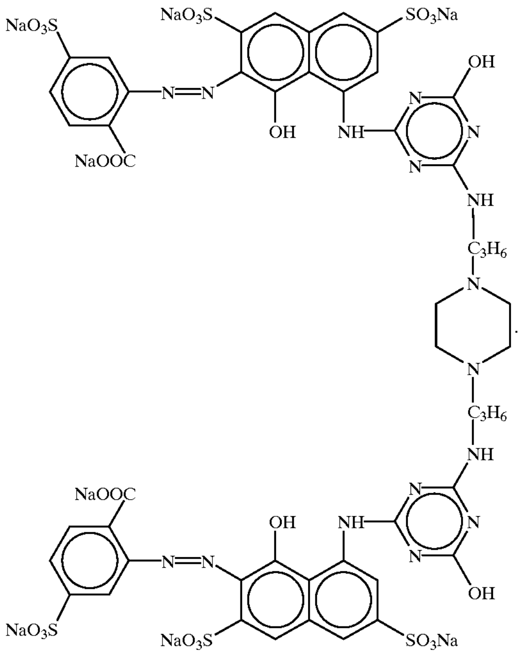

(ii) applying an aqueous liquid composition to an image-forming region on a recording medium, the liquid composition reacting with the water-soluble dye in the ink when the liquid composition contacts the ink of magenta color on the recording medium; and (iii) applying the ink to the image-forming region;

wherein steps (ii) and (iii) are conducted so that the liquid composition and the ink contact each other at the image-forming region.

13. The process according to claim 12, wherein step (iii) is conducted prior to step (ii).

14. The process according to claim 12, wherein the liquid composition comprises a cationic polymer.

15. The process according to claim 14, wherein the cationic polymer has a weight average molecular weight in a range of from 400 to 1400.

16. The process according to claim 15, wherein the cationic polymer is contained in the liquid composition in an amount of from 1 to 20 wt % based on the liquid composition.

17. The process according to claim 12, wherein step (ii) comprises a sub-step of ejecting the aqueous liquid composition by an ink-jet process.

18. The process according to claim 12, wherein step (iii) comprises a sub-step of ejecting the aqueous ink by an ink-jet process.

* * * * *

UNITED STATES PATENT AND TRADEMARK OFFICE

CERTIFICATE OF CORRECTION

PATENT NO. : 6,281,917 B1
DATED : August 28, 2001
INVENTOR(S) : Ryuji Katsuragi et al.

It is certified that error appears in the above-identified patent and that said Letters Patent is hereby corrected as shown below:

Title page,
Item [57], ABSTRACT,
Line 19, "ness meter," should read -- nessmeter --.

Column 2,
Line 21, "ness meter," should read -- nessmeter --.

Column 4,
Line 25, "tonically" should read -- ionically --.

Column 12,
Line 42, "cationiw" should read -- cationic --.

Column 14,
Line 41, "view,along" should read -- view along --.
Line 56, "Now;" should read -- Now, --.

Column 18,
Line 4, "part" should read -- parts --.
Line 47, "part" should read -- parts --.
Line 65, "part" should read -- parts --.

Signed and Sealed this

Ninth Day of April, 2002

*Attest:*

JAMES E. ROGAN
*Director of the United States Patent and Trademark Office*

*Attesting Officer*